US010812377B2

(12) United States Patent
Stammers et al.

(10) Patent No.: US 10,812,377 B2
(45) Date of Patent: Oct. 20, 2020

(54) METHODS AND APPARATUS FOR USE IN PROVIDING TRANSPORT AND DATA CENTER SEGMENTATION IN A MOBILE NETWORK

(71) Applicant: Cisco Technology, Inc., San Jose, CA (US)

(72) Inventors: Timothy Peter Stammers, Raleigh, NC (US); Kent Kinchu Leung, Palo Alto, CA (US); Michael David Geller, Weston, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1 day.

(21) Appl. No.: 16/159,565

(22) Filed: Oct. 12, 2018

(65) Prior Publication Data

US 2020/0120022 A1    Apr. 16, 2020

(51) Int. Cl.
| | | |
|---|---|---|
| G06F 15/173 | (2006.01) | |
| H04L 12/713 | (2013.01) | |
| H04L 12/46 | (2006.01) | |
| H04L 29/06 | (2006.01) | |
| H04L 29/08 | (2006.01) | |

(52) U.S. Cl.
CPC ........ *H04L 45/586* (2013.01); *H04L 12/4633* (2013.01); *H04L 12/4641* (2013.01); *H04L 63/20* (2013.01); *H04L 67/16* (2013.01)

(58) Field of Classification Search
CPC ............... H04L 45/586; H04L 12/4633; H04L 12/4641; H04L 63/20; H04L 67/16
USPC ....................................................... 709/238
See application file for complete search history.

(56) References Cited

U.S. PATENT DOCUMENTS

| | | | |
|---|---|---|---|
| 6,765,881 B1 | 7/2004 | Rajakarunanayake | |
| 8,839,409 B2 | 9/2014 | Cheriton | |
| 9,049,233 B2 | 6/2015 | Frost et al. | |
| 9,369,303 B2 | 6/2016 | Diwane et al. | |
| 2017/0026417 A1* | 1/2017 | Ermagan | ........... H04L 29/06612 |
| 2017/0063822 A1* | 3/2017 | Jain | ..................... H04L 67/1097 |
| 2017/0064749 A1* | 3/2017 | Jain | ....................... H04W 76/12 |
| 2017/0346718 A1* | 11/2017 | Psenak | ................... H04L 45/02 |

(Continued)

OTHER PUBLICATIONS

Segment Routing: Cutting Through the hype and finding the IETF's Innivative Nugget of Gold, by Adrian Farrel et al. Jul. 5, 2017, IETF Journal.*

(Continued)

*Primary Examiner* — Frantz B Jean

(57) ABSTRACT

In a mobile network, an identity of a security group associated with user equipments (UEs) may be obtained. A segment route (SR) path for session communications in the mobile network for the UEs may be selected based on the identity of the security group. The SR path may be one of a plurality of SR paths in a transport network used by the mobile network and defined at least in part by one or more segment IDs (SIDs). An identity of a virtual network associated with the security group may also be obtained. The selected SR path and the identity of the virtual network may be provisioned in one or more routers of the transport network, such that IP messages communicated for the UEs in the mobile network are forwarded via the selected SR path and (at least ultimately) via the tunnel associated with the security group.

20 Claims, 26 Drawing Sheets

(56) References Cited

U.S. PATENT DOCUMENTS

| | | | |
|---|---|---|---|
| 2018/0270743 | A1 | 9/2018 | Callard et al. |
| 2018/0367402 | A1* | 12/2018 | Harneja ................ H04L 41/12 |
| 2019/0190818 | A1* | 6/2019 | Ceccarelli ............. H04L 45/24 |
| 2019/0191467 | A1* | 6/2019 | Dao ..................... H04W 76/11 |
| 2019/0268383 | A1* | 8/2019 | Maino ............... H04L 12/4633 |
| 2019/0306251 | A1* | 10/2019 | Talebi Fard ........... H04L 67/16 |

OTHER PUBLICATIONS

Kim et al., "Spring Use Cases for Mobile Network", Network Working Group of Internet Draft for Internet Engineering Task Force (IETF), Oct. 31, 2016, pp. 1-12.

International Search Report and Written Opinion in counterpart International Application No. PCT/US2019/054431, dated Feb. 7, 2020, 15 pages.

S. Matsushima et al., "Segment Routing IPv6 for Mobile User Plane", draft-ietf-dmm-srv6-mobile-uplane-02, DMM Working Group, Internet-Draft, Intended status: Standards Track, Jul. 2, 2018, 26 pages.

Juniper Networks, Inc., "Delivering an Integrated, Secure, and Radio-Aware 5G, Transport Network", 3510647-001-EN, Sep. 2018, 4 pages.

J. Chunduri, Ed. et al., "Transport Network aware Mobility for 5G", draft-clt-dmm-tn-aware-mobility-02, DMM Working Group, Internet-Draft, Intended status: Standards Track, Oct. 16, 2018, 20 pages.

S. Matsushima et al., "Segment Routing IPv6 for Mobile User Plane", draft-ieff-dmm-srv6-mobile-uplane-03, DMM Working Group, Internet-Draft, Intended status: Standards Track, Oct. 22, 2018, 28 pages.

A. Sgambelluri et al., "SDN and PCE Implementations for Segment Routing", Jun. 30-Jul. 2, 2015, 4 pages.

SoftBank Corp., "Pseudo-CR on SRv6 Impact for 5GC", 3GPP TR 29.892, C4-187226, 3GPP TSG CT WG4 Meeting #86-bis, Oct. 2018, 2 pages.

SoftBank Corp., "Pseudo-CR on SRv6 Impact on SMF", 3GPP TR 29.892, C4-187225, 3GPP TSG CT WG4 Meeting #86-bis, Oct. 2018, 2 pages.

3GPP, "3rd Generation Partnership Project; Technical Specification Group Core Network and Terminals; Study on User Plane Protocol in 5GC. (Release 16)", 3GPP TR 29.892 V0.3.0, Oct. 2018, 20 pages.

* cited by examiner

METHODS AND APPARATUS FOR USE IN PROVIDING TRANSPORT AND DATA CENTER SEGMENTATION IN A MOBILE NETWORK

TECHNICAL FIELD

The present disclosure relates generally to mobile networks and segment routing (SR), and more particularly to methods and apparatus for use in providing transport and data center segmentation in mobile networks implementing segment routing for communications.

BACKGROUND

It would be desirable to provide transport and data center segmentation in mobile networks (e.g. 5G mobile networks) that implement segment routing (SR) or SR for IPv6 (SRv6).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
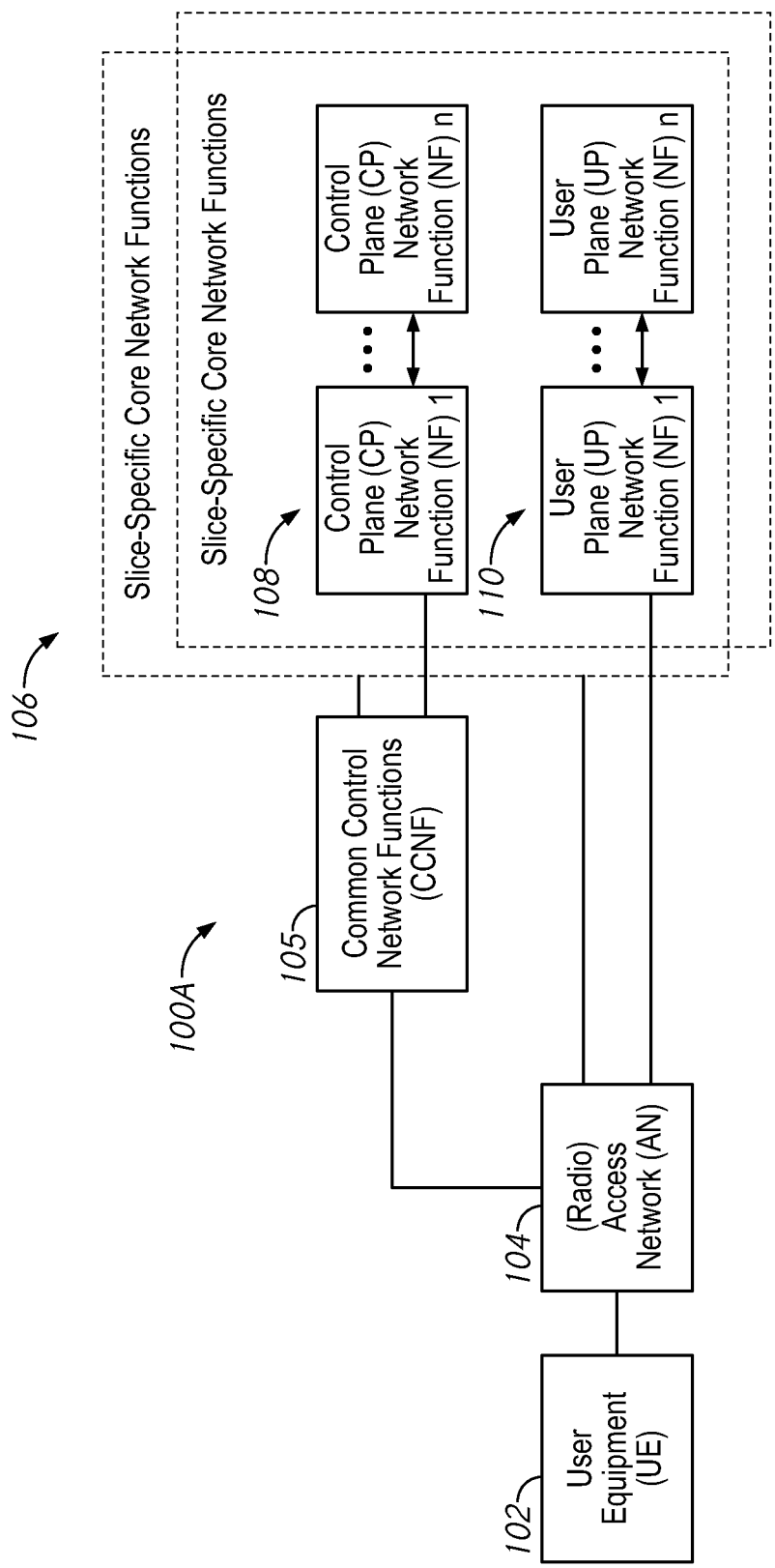
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in providing transport and data center segmentation in a mobile network are described herein.

In one illustrative example, an identity of a security group associated with one or more user equipments (UEs) operative in a mobile network may be obtained. A segment route (SR) path for session communications in the mobile network for the one or more UEs may be selected based on the identity of the security group. The SR path may be one of a plurality of SR paths in a transport network used by the mobile network and defined at least in part by one or more segment IDs (SIDs). The SR path may be for exclusive use for the one or more UEs of the security group. An identity of a virtual network associated with the security group may also be obtained. The identity of the virtual network may be associated with one of a plurality of tunnels configurable in the transport network used by the mobile network. The identity of the virtual network may be a virtual extensible LAN (VXLAN) network identifier (VNI) associated with a VXLAN. The selected SR path and the identity of the virtual network may be provisioned in one or more routers of the transport network, such that IP messages communicated for the one or more UEs in the mobile network are forwarded via the selected SR path and (at least ultimately) via the tunnel associated with the security group. In some implementations, the SR paths may be pre-provisioned in the one or more routers.

More detailed and alternative techniques and implementations are provided herein as will be described below.

Example Embodiments

As mentioned in the Background section, it would be desirable to provide transport and data center segmentation in mobile networks (e.g. 5G mobile networks) that implement segment routing (SR), or more specifically, SR for IPv6 (SRv6).

According to some implementations of the present disclosure, what is provided is intelligence to make slicing and node selection choices with group identification to influence the choice of a segment route within a network slice for flows considering segmentation policies for the group, and provide data center segmentation for those flows as an inherent result of choosing the segment route. In preferred implementations, the groups may be "security groups" which may be identified by security group tags (SGTs).

Segment routing may be used to steer traffic in a segment routing (e.g. SRv6) domain, which may be defined at least in part between a set of gNBs and a set of user plane functions (UPFs). Each available UPF may be defined or provided as the endpoint of the last segment (e.g. a segment identifier or "SID") of one or more segment routes between the gNBs and UPFs. Segment routes to each UPF may be created or calculated for each one of a plurality of security groups. Such a technique may result in a set of segment routes to each UPF, with a segment route corresponding to each security group of a security policy. Thus, traffic segmentation in the transport domain may be provided based on the security group.

To facilitate segmentation for groups of traffic within a data center, a suitable identifier may be appended to the traffic. The identifier may be, for example, an identifier for a virtual extensible local area network (VXLAN) or a VXLAN Network ID (VNI). VXLAN provides an overlay network with distinct virtual networks based on the VNI (network slice). As is apparent, a (unique) VNI may be associated with a segment route of the security group. Here, the VNI may be populated and carried in an SRv6 header (SRH) together with any mobile-identifying information, if and as needed.

During session establishment for a user equipment (UE) associated with a security group, an access and mobility management function (AMF) may determine a network slice and select a session management function (SMF) for the session. The selected SMF may then request a session policy from a policy control function (PCF). The SMF may receive an identification of a security group (e.g. an SGT) as part of the session policy response. The SMF may then select a UPF which is programmed with relevant flow definition for Quality of Service (QoS) treatment, charging considerations, etc.

An ingress point of the SRv6 domain may be programmed by the SMF with classification rules that direct traffic between the gNB and the UPF to the appropriate segment route associated with the security group. The programming may be alternatively performed by a different entity, such as an SRv6 domain controller, as requested. Subscription identification, such as a Mobile Station International Subscriber Directory Number (MSISDN) and/or an International Mobile Subscriber Identity (IMSI), may be provided if and as needed. As a result of the prior segmentation provisioning, the choice of segment route based on identifier of the security group may determine the VNI that is associated with the traffic once in the data center.

Thus, subscriber sessions may be distributed amongst UPFs located in an SR domain. Traffic arriving at an SRv6 ingress point from the gNB may be classified and directed to a segment route to a UPF that is identified by a segment route end SID. Appropriate treatment and features may be applied to the traffic at the UPF. In some implementations, an SRH type-length-value (TLV) or a network service header (NSH) may be populated with metadata, such as session ID, for the subscriber context; this metadata may provide a correlation to the IMSI, session QoS and/or charging rules, etc., at and for the UPF. The UPF may send the traffic on the interface to the data center, adding the VNI carried in the SRH to an L2 data center header on the N6 interface. In some implementations, the NSH or the VXLAN may be used for service chaining for various applications within a slice of data plane (DP) network functions (NFs). Also in some implementations, the SR may be enhanced with use of a VRF ID (e.g. per network slice) and metadata (session ID).

Accordingly, an association of segment route with data center segmentation identifier may be provided for associating the route with a security group. The choice of segment route may be influenced on session establishment based on the security group policy of the mobile subscription associated with the session/application. A data center segmentation identifier may be carried in a segment route header so that a UPF may link transport and data center segmentation.

To better illustrate in relation to the drawings, FIG. 1A is an illustrative representation of a network architecture 100a of a 5G mobile network configured to facilitate communications for user equipment (UE) 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
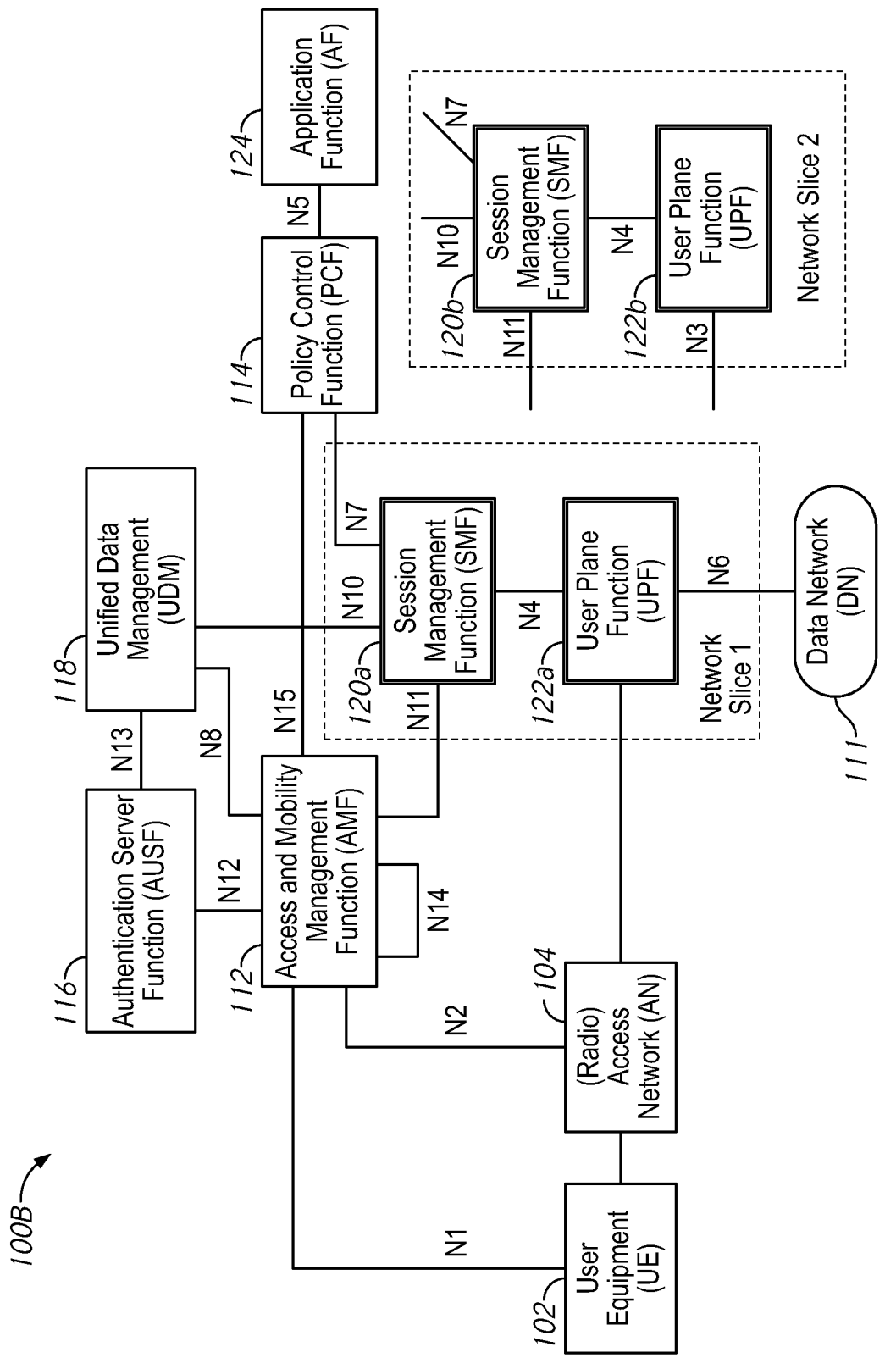
FIG. 1B is an illustrative representation of a more detailed network architecture of the mobile network of FIG. 1A.

FIG. 1B is an illustrative representation of a more detailed network architecture 100b of the 5G mobile network of FIG. 1A. As provided in 3GPP standards for 5G (e.g. 3GPP 23.501 and 23.502), network architecture 100b for the 5G mobile network may include an authentication server function (AUSF) 116, a unified data management (UDM) 118 (having a unified data repository or UDR), an AMF 112, a policy control function (PCF) 114, an SMF 120a, and a UPF 122a. A plurality of interfaces or reference points N1 through N15 shown in FIG. 1B may define the communications and/or protocols between each of the entities, as described in the relevant (evolving) standards documents. One or more application functions, such as an application function (AF) 124, may connect to the 5G mobile network via PCF 114. One or more data networks (DN) 111 having application servers (AS) may be connected to the 5G mobile network through UPFs such as UPF 122a.

UPF 122a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

Figure 1C:
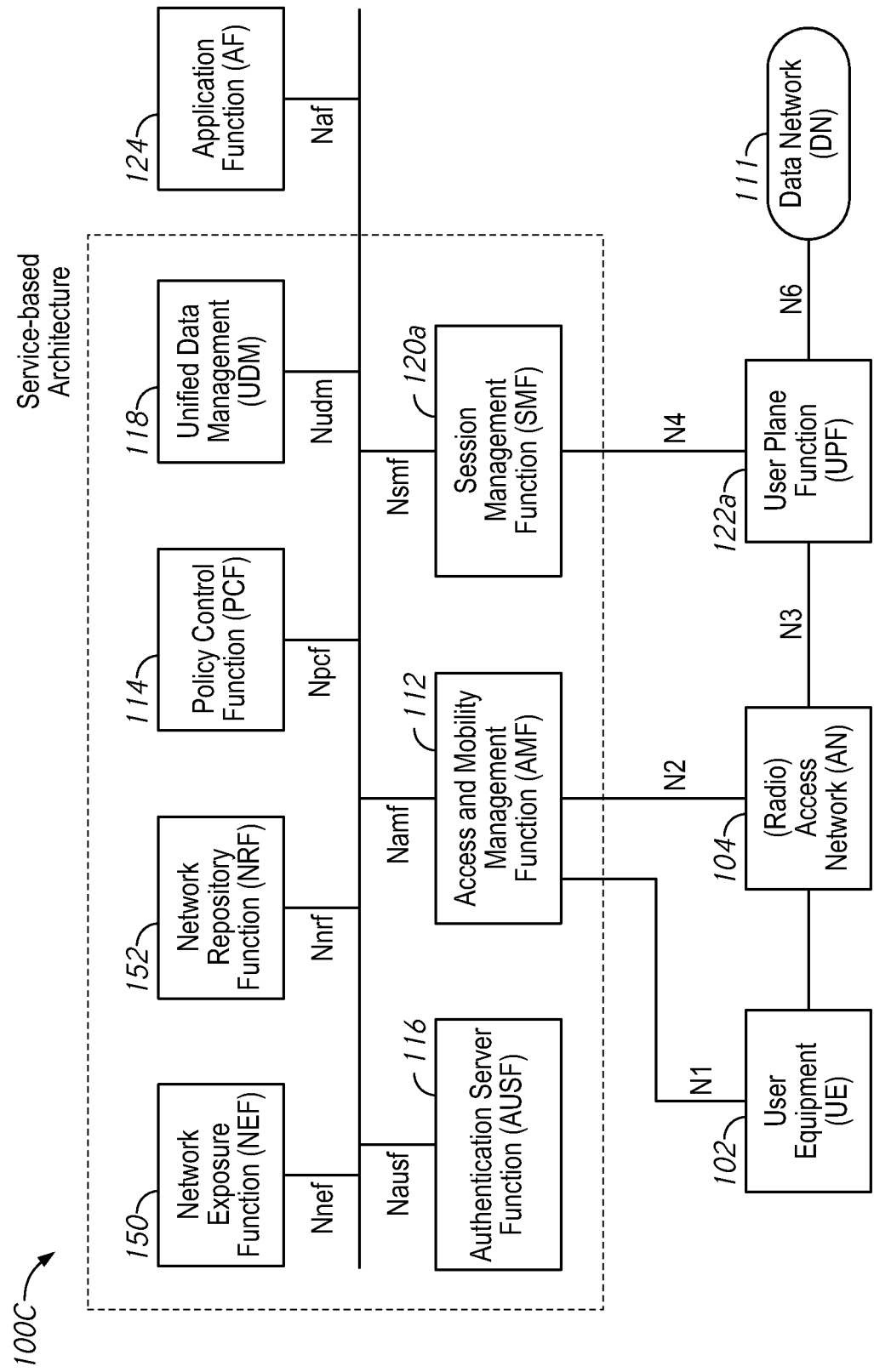
FIG. 1C is an illustrative representation of the mobile network of FIGS. 1A-1B as a service-based architecture.

In FIG. 1C, a service-based architecture 100C of the 5G mobile network of FIGS. 1A-1B is illustrated. Network node functions in the service-based architecture 100C of FIG. 1C, not shown in FIGS. 1A-1B, include a network exposure function (NEF) entity 150 and an NF repository function (NRF) 152. A plurality of interfaces N1 through N6, as well as interfaces $N_{nef}$, $N_{nrf}$, $N_{pcf}$, $N_{udm}$, $N_{ausf}$, $N_{amf}$, $N_{smf}$, and $N_{af}$, may define the communications and/or protocols between each of the entities, as described in the relevant (evolving) standards. Note that NRF 152 of FIG. 1C may be configured in accordance with 3GPP specifications, such as 3GPP TS 23.501. General operation of NRF 152 may provided for in section 6.2.6 of the specification.

In the present disclosure, network elements in the mobile network may make use of SR for communications, including session communications, in relation to the defined interfaces/reference points. The segment routing (SR) may be SR for IPv6 (SRv6). To illustrate a few SRv6 examples, FIGS. 2A-2D are block diagrams of network nodes which are configured to route packets using SRv6.

Figure 2A:
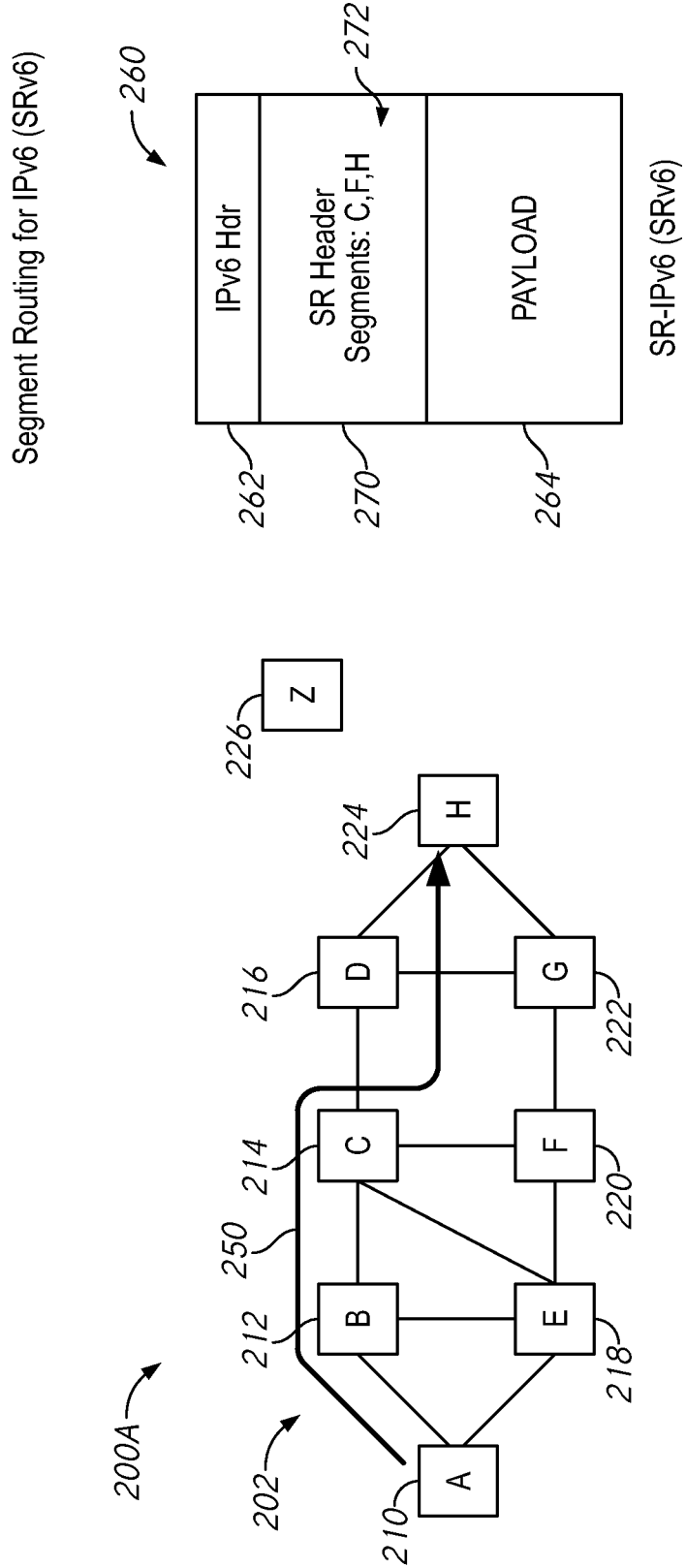
FIGS. 2A-2D are illustrative block diagrams of communication networks operative to route communications with use of segment routing (SR) and, in particular, SR for IPv6 (SRv6)

With reference first to FIG. 2A, a network 200a which includes a plurality of nodes 202 (e.g. routers, servers, base stations, gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g.

forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
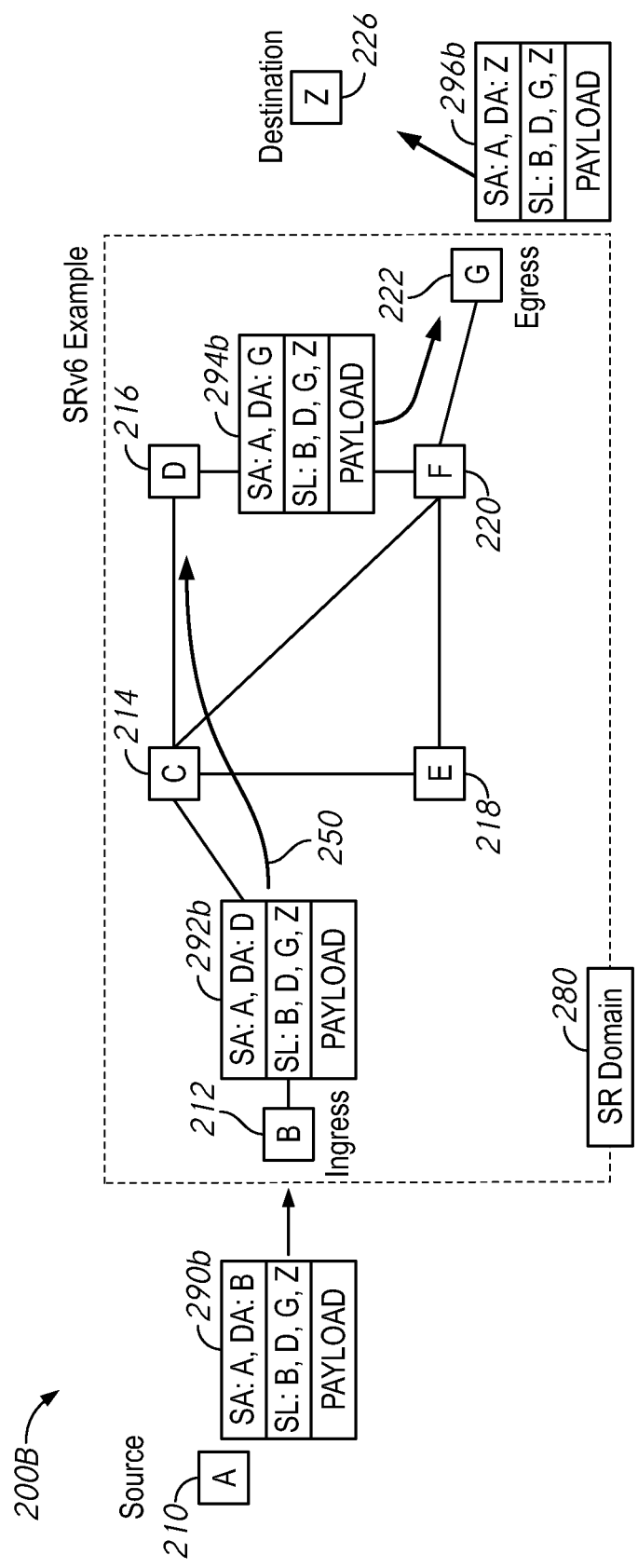

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered an ingress node of the SR domain 280 and node 222 or G may be considered an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290b. Here, the SR header of SR-IPv6 packet 290b includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
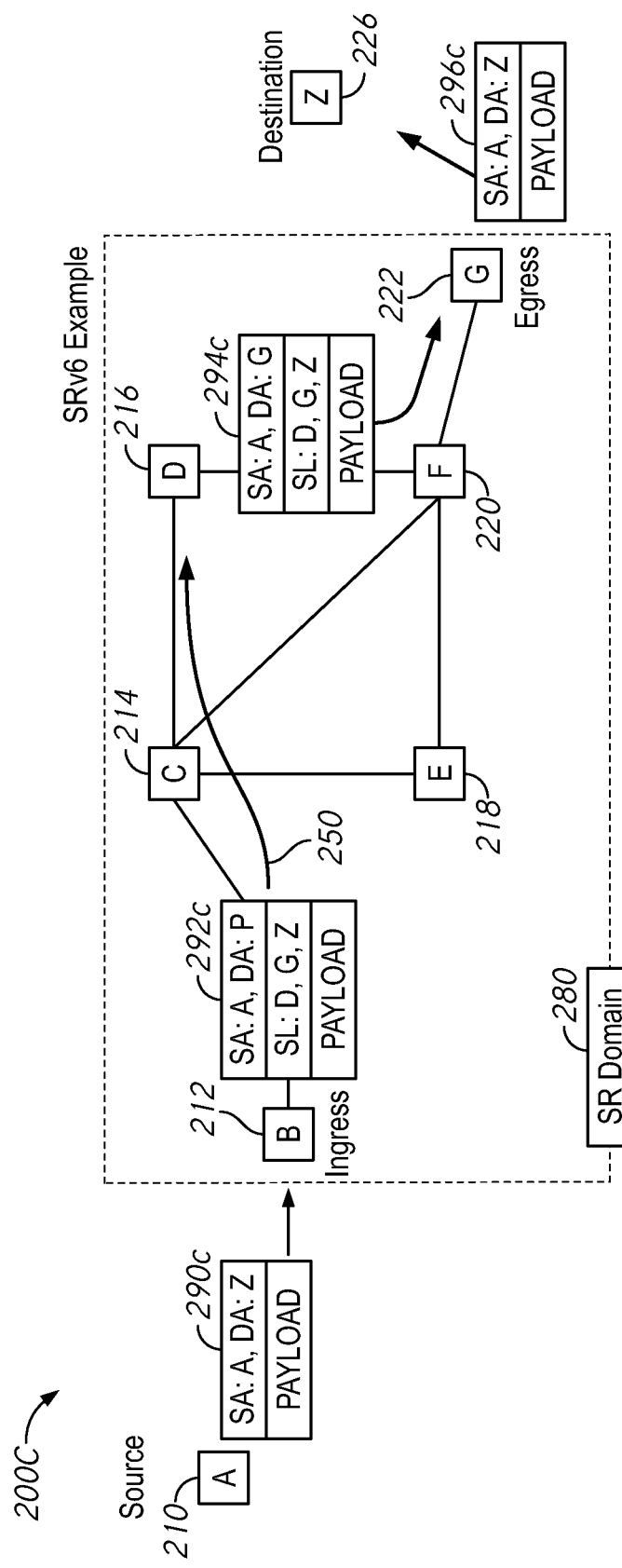

In the example of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
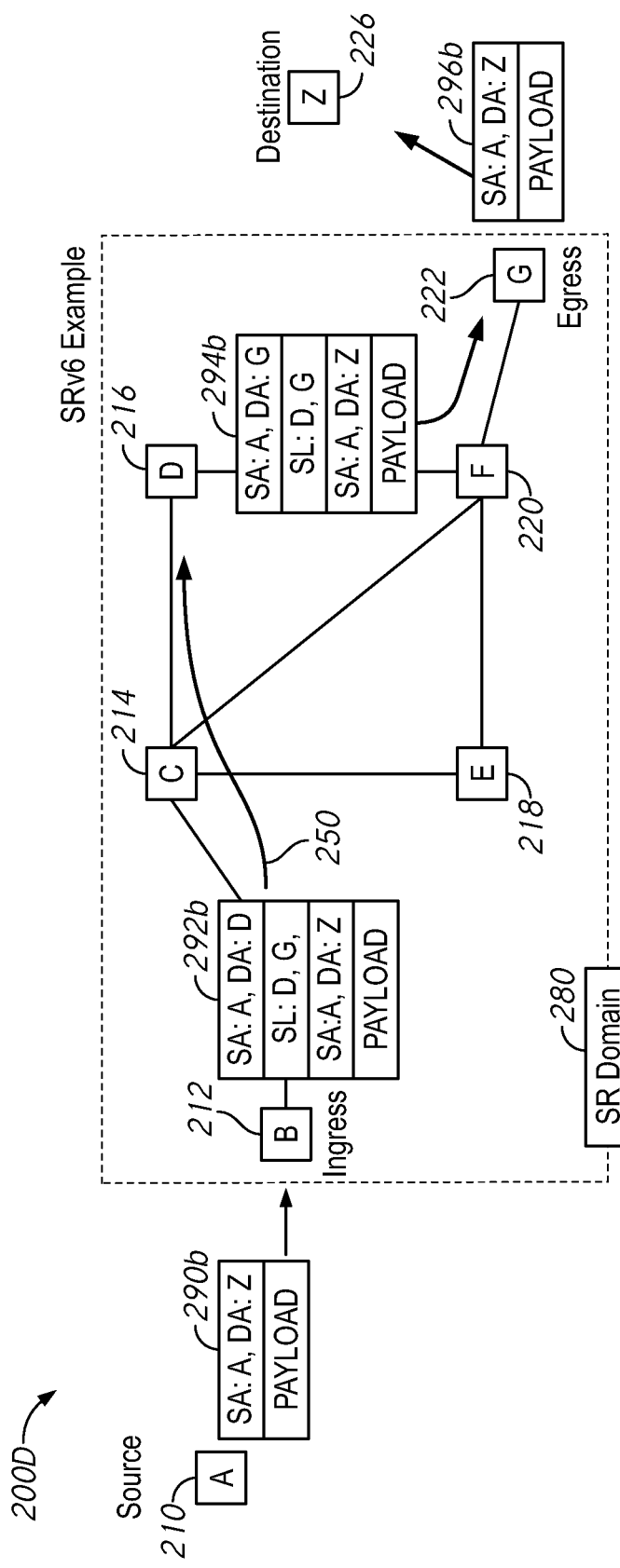

In the example of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

The current state of the art for SRv6 may be further described in various standards-related documents, including Internet Engineering Task Force (IETF) documents, such as "Segment Routing Architecture" identified by "draft-ietf-spring-segment-routing-14"; "IPv6 Segment Routing Header (SRH)" identified by "draft-ietf-6man-segment-routing-header-07"; and "SRv6 Network Programming" identified by "draft-filsfils-spring-srv6-network-programming-03".

Given the use of SR (e.g. SRv6) in next generation mobile networks, there is a need to provide transport and data center segmentation in the mobile network, e.g., the 5G mobile network generally described in relation to FIGS. 1A, 1B, and 1C.

Transport segmentation in the mobile network may be provided with use of SR path information associated with SR paths in a transport network used by the mobile network. The SR path information may be made available, provided and communicated for use in the mobile network, in many different ways. For example, SR path information may be provided and communicated in the mobile network with use of an NRF and one or more SR path computation entities (SR-PCEs).

Figure 3:
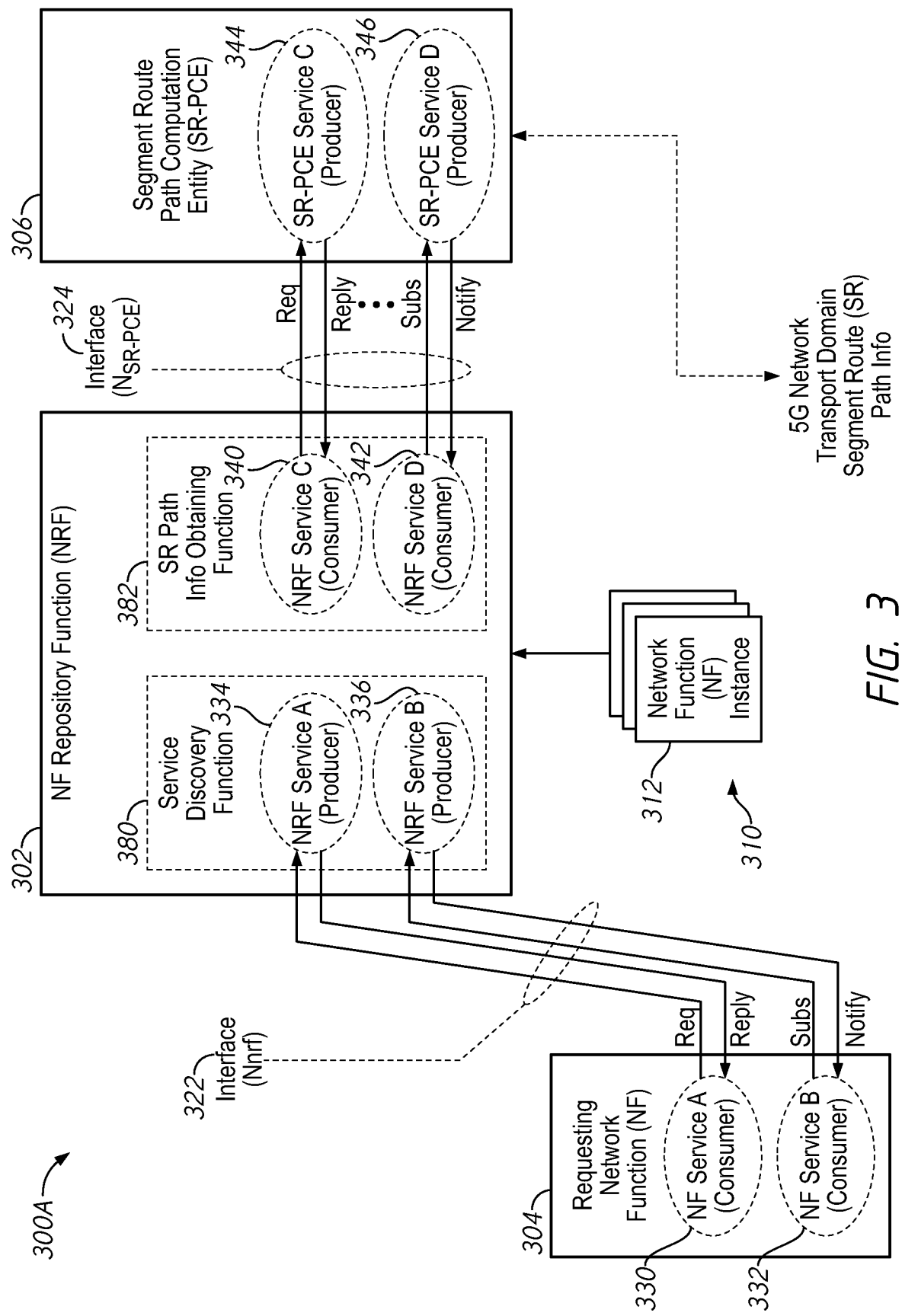
FIG. 3 is an illustrative representation of a network function (NF) repository function (NRF) of the mobile network, where the NRF has a first interface comprising an Nnrf interface of a service discovery function and a second interface of a SR path information obtaining function for interfacing with a SR path computation entity (SR-PCE)

To better illustrate this example, FIG. 3 is an illustrative representation of a Network Function (NF) Repository Function (NRF) 302 suitable for use in a 5G mobile network that utilizes segment routing (SR) according to at least some implementations of the present disclosure. NRF 302 may be configured in accordance with 3GPP specifications but modified according to the techniques of the present disclosure. In FIG. 3, NRF 302 is shown to have an interface 322 (i.e. a first interface) and an interface 324 (i.e. a second interface).

Interface 322 may be an $N_{nrf}$ interface for use with a service discovery function 380 of the NRF. The $N_{nrf}$ interface with the service discovery function 380 may be configured to receive a discovery request from an NF (e.g. a requesting NF 304), discover one or more NF instances (e.g. NF instances 310, such as an NF instance 312) based on at least one service, application, or subscription requirement obtained according to the discovery request, and respond to the discovery request with the one or more discovered NF instances (e.g. information regarding the discovered NF instance). Here, service discovery function 380 may include an NRF service (producer) 334 for receiving and replying to discovery requests associated with an NF service (consumer) 330 of requesting NF instance 304. Additionally or alternatively, service discovery function 380 may include an NRF service (producer) 336 for receiving subscription requests and providing notifications/publications associated with an NF service (consumer) 332 of requesting NF instance 304.

Interface 324 may be for use with a SR path information obtaining function 382 for interfacing with a SR path computation entity (SR-PCE) 306. SR-PCE 306 may be configured to obtain SR path information associated with various SR paths between NF instances or nodes in the mobile network (e.g. SR path computation, analysis, etc.). These nodes may be part of a transport network that is used by the mobile network. SR-PCE 306 may be or include an SR-PCE server and/or one or more routers of the transport network used by the mobile network.

The SR path information may be or include information that identifies and/or defines the SR paths, and/or operating or policy parameters associated with the SR paths, in relation to NF instances or nodes which may be or include, for example, AMF instances, SMF instances, UPF instances, or other such as RAN nodes including gNB nodes or base stations. An SR path may be defined (at least in part) by one or more Segment IDs (SIDs) or a SID list. Parameters associated with the SR paths may be or include an operating status parameter, a latency parameter, a resiliency parameter, and a bandwidth parameters. Another parameter associated with an SR path may be a weight or preference parameter, for use in a weighted or preferential selection of an SR path (e.g. during NF selection). This weight or preference parameter may be set by NRF 302 or SR-PCE 306; the operating status parameter may also be set by NRF 302 or SR-PCE 306.

SR path information obtaining function 382 of NRF 302 may be configured to receive SR path information associated with an SR path of at least some of a plurality of SR paths between different pairs of NF instances (e.g. NF instances 310) or nodes which are candidate pairs for session communication. Again, the NF instances or nodes may be or include, for example, AMF instances, SMF instances, UPF instances, or other such as RAN nodes including gNB nodes or base stations. SR path information obtaining function 382 may be configured to store the SR path information for each SR path in association with the respective candidate pair or at least one of the NF instances of the pair. In some implementations, NRF 302 may be configured to maintain such SR path information in relation to NF profile information, such as that described in relation to 3GPP specifications, including section 6.2.6 of 3GPP TS 23.501.

In some implementations, SR path information obtaining function 382 may include an NRF service (consumer) 340 for requesting and receiving information from a SR-PCE service (producer) 344 of SR-PCE 306. Additionally or alternatively, SR path information obtaining function 342 may include an NRF service (consumer) 342 for subscribing to notifications/publications of a SR-PCE service (producer) 346 of SR-PCE 306.

In some implementations, the SR path information described herein may be provided to enforce comparable or matching policy in the transport domain and/or SR domain (see e.g. FIG. 5) and, in particular, at an SRv6 ingress node of the SR domain for UE sessions as described later in relation to the figures.

Figure 4:
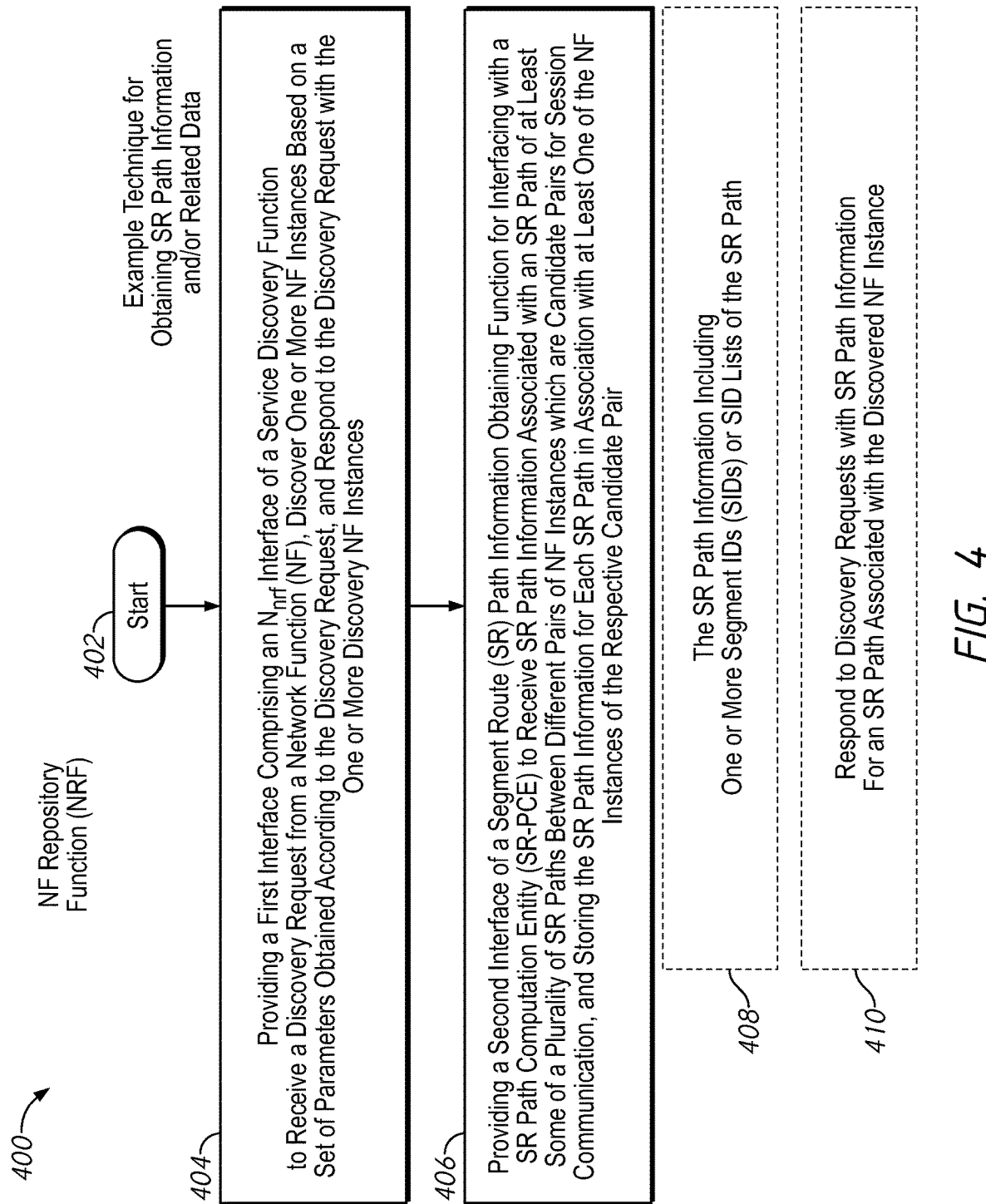
FIG. 4 is a flowchart for describing an example method for use with an NRF of FIG. 3 to facilitate the availability of SR path information in the mobile network.

FIG. 4 is a flowchart 400 for describing a method for use with an NRF of a mobile network to facilitate the availability of SR path information in the mobile network. The method may be performed at a mobility node, such as one or more NRF nodes. The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Beginning at a start block 402 of FIG. 4, the method includes providing an NRF with a first interface comprising an $N_{nrf}$ interface of a service discovery function (step 404 of FIG. 4). The service discovery function with the first interface may be configured to receive a discovery request from a network function (NF), discover one or more NF instances based on at least one of a service, application, or subscription requirement obtained according to the discovery request, and respond to the discovery request with the one or more discovered NF instances. The method further includes providing the NRF with a second interface of a segment route (SR) path information obtaining function for interfacing with a SR path computation entity (SR-PCE) (step 406 of FIG. 4). The SR path information obtaining function may be configured to receive SR path information associated with an SR path of at least some of a plurality of SR paths between different pairs of NF instances or nodes which are candidate pairs for session communication, and store the SR path information for each SR path in association with at least one of the NF instances of the respective candidate pair.

The SR path information referred to in step 406 may be one or more SIDs or a SID list which defines the SR path (block 408 of FIG. 4). In addition or as an alternative, the SR path information referred to in step 406 may be one or more SR path policy parameters, which may be or include an operational status parameter, a latency parameter, a resiliency parameter, and a bandwidth parameter.

Further, the service discovery function with the $N_{nrf}$ interface may be further configured to respond to discovery requests with SR path information for an SR path associated with the discovered NF instance (block 410 of FIG. 4). In addition or as an alternative the service discovery function may be further configured to discover one or more NF instances based on identifying an NF instance being associated with SR path information that accords to least one service, application, or subscription requirement obtained according to the discovery request.

Figure 5:
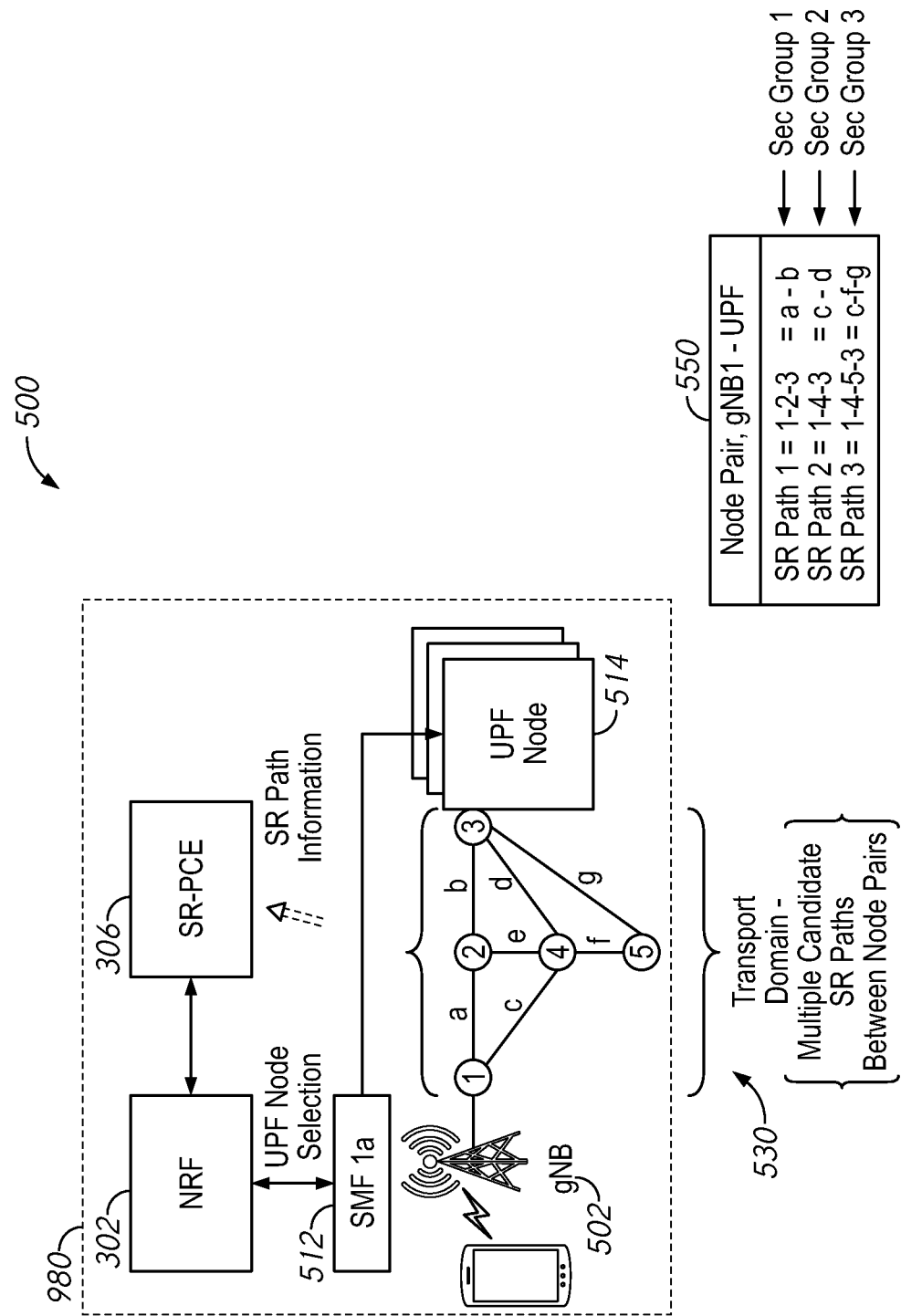
FIG. 5 is an example arrangement of network nodes and functions of the mobile network, further illustrating candidate SR paths of a transport network used by the mobile network (e.g. for communication between a gNB and a UPF)

FIG. 5 is an example arrangement 500 of network nodes and functions of the mobile network, further illustrating candidate SR paths of a transport network used by the mobile network (e.g. for communication between a gNB and a UPF). In the example of FIG. 5, NRF 302 and SR-PCE 306 described in relation to FIGS. 3-4 and subsequent figures may be employed for obtaining SR path information. As indicated in FIG. 5, an SMF 512 may select a UPF 514 (e.g. based on consulting NRF 302) for a session of a UE that is served by a base station (e.g. gNB). The gNB may communicate with the UPF 514 over one of a plurality of SR paths in a transport network 530.

As is apparent from FIG. 5, a node pairing (e.g. gNB-UPF instance) may be associated with a plurality of different candidate SR paths. For example, as indicated in a table 550 of FIG. 5, an SR path 1 between the gNB and UPF 514 may be defined by routing points 1-2-3 (or segments a-b); an SR path 2 between the gNB and UPF 514 may be defined by routing points 1-4-3 (or segments c-d); and an SR path 3 between the gNB and UPF 514 may be defined by routing points 1-4-5-3 (or segments c-f-g).

According to at least some implementations of the present disclosure, a group for shared-access or "security group" may be associated with one of a plurality of SR paths for session communication (e.g. for exclusive use of the SR path). In FIG. 5, for example, a security group 1 may be associated with SR path 1, a security group 2 may be associated with SR path 2, a security group 3 may be associated with SR path 3.

Figure 6:
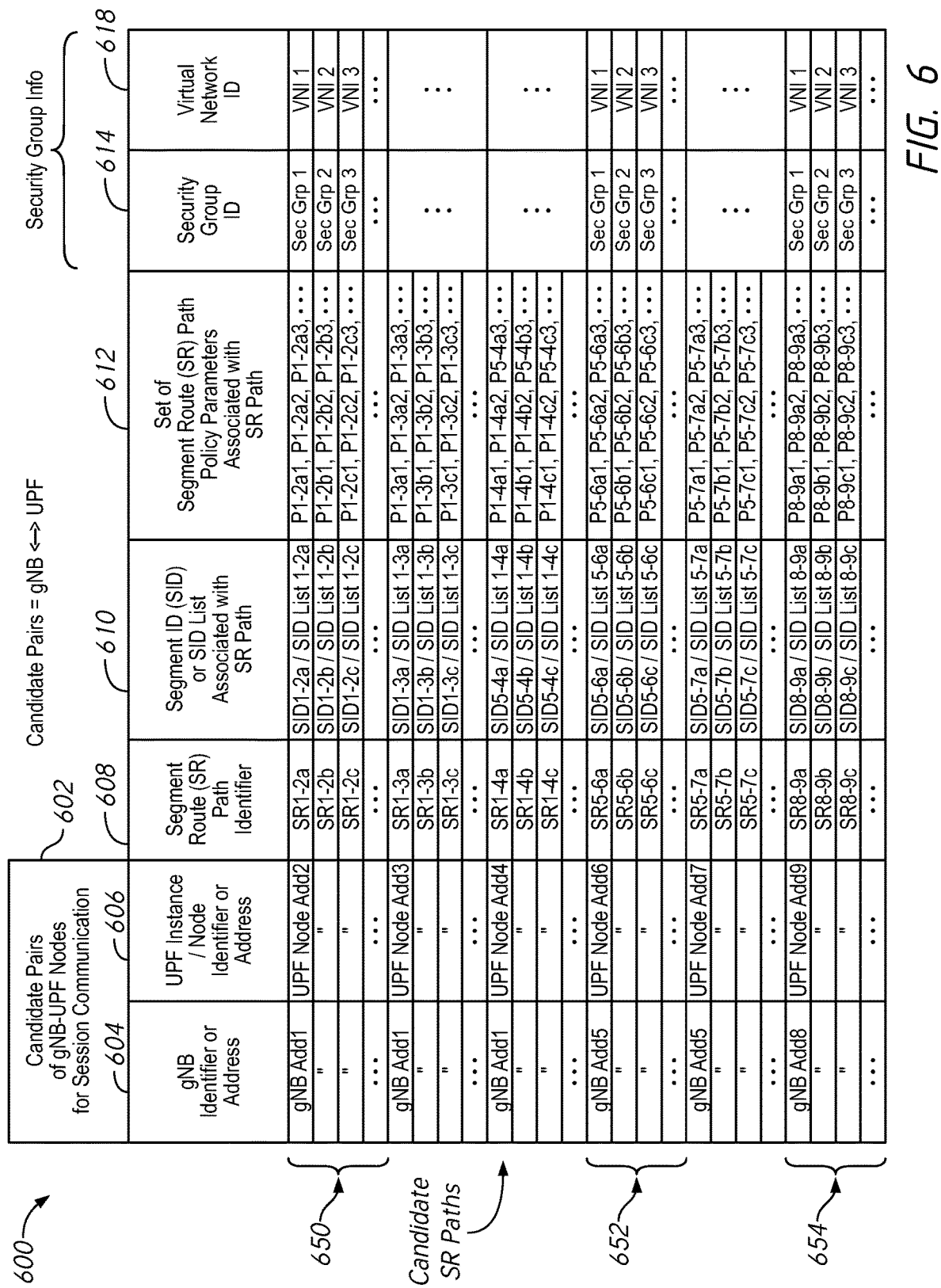
FIG. 6 is a table which provides example SR path information of candidate SR paths in the transport network used by the mobile network, and including stored associations with identities of security groups and virtual networks, according to at least some implementations of the present disclosure.

FIG. 6 is a table 600 which provides example SR path information (see e.g. columns 608, 610, and/or 612) associated with each SR path (see the various rows of table 600)

of a plurality of different candidate SR paths for different candidate pairs 602 of mobility nodes/NFs. In the example of FIG. 6, the different candidate pairs 602 of mobility nodes/NFs are different candidate pairs of gNB-UPF instances 604 and 606 for session communications. As indicated, the SR path information may be stored in association with at least one of the nodes 604 and 606 of the respective candidate pair 602. The SR path information of FIG. 6 is shown to include an SR path identifier which may identify the SR path (see e.g. column 608), a SID or a SID list which may define the SR path (see e.g. column 610), and a set of SR path policy (e.g. calculated) parameters of the SR path (e.g. operational status, a latency parameter, a resiliency parameter, and a bandwidth parameter).

Table 600 also provides example security group information (see e.g. columns 614 and 618) which may be related to and/or stored in association with each SR path (see the various rows of table 600) according to some implementations. The security group information may be or include identities of security groups (column 614). The security group information may be or include SGTs or security group numbers. Additionally or alternatively, security group information may be or include identities of virtual networks (e.g. a virtual extensible LAN (VXLAN) network identifier (VNI) associated with a VXLAN) (column 618). Again, a security group may be associated with one of a plurality of candidate SR paths for session communication (e.g. for exclusive use of the SR path). In the example of FIG. 6, a security group 1 associated with VNI 1 may utilize SR path SR1-2a for session communications, a security group 2 associated with VNI 2 may utilize SR path SR1-2b, a security group 3 associated with VNI 3 may utilize SR path SR1-2c for session communications, etc. as shown in candidate SR path grouping 650, and similarly with the other candidate SR path groupings 652 and 654, as examples.

As is apparent, table 600 is an illustrative example of data item relationships and stored associations which may be made in relation to SR path information, one or more mobility nodes such as gNBs or NFs, security group information, and/or virtual network information. It is noted that many different variations may be realized.

Figure 7A:
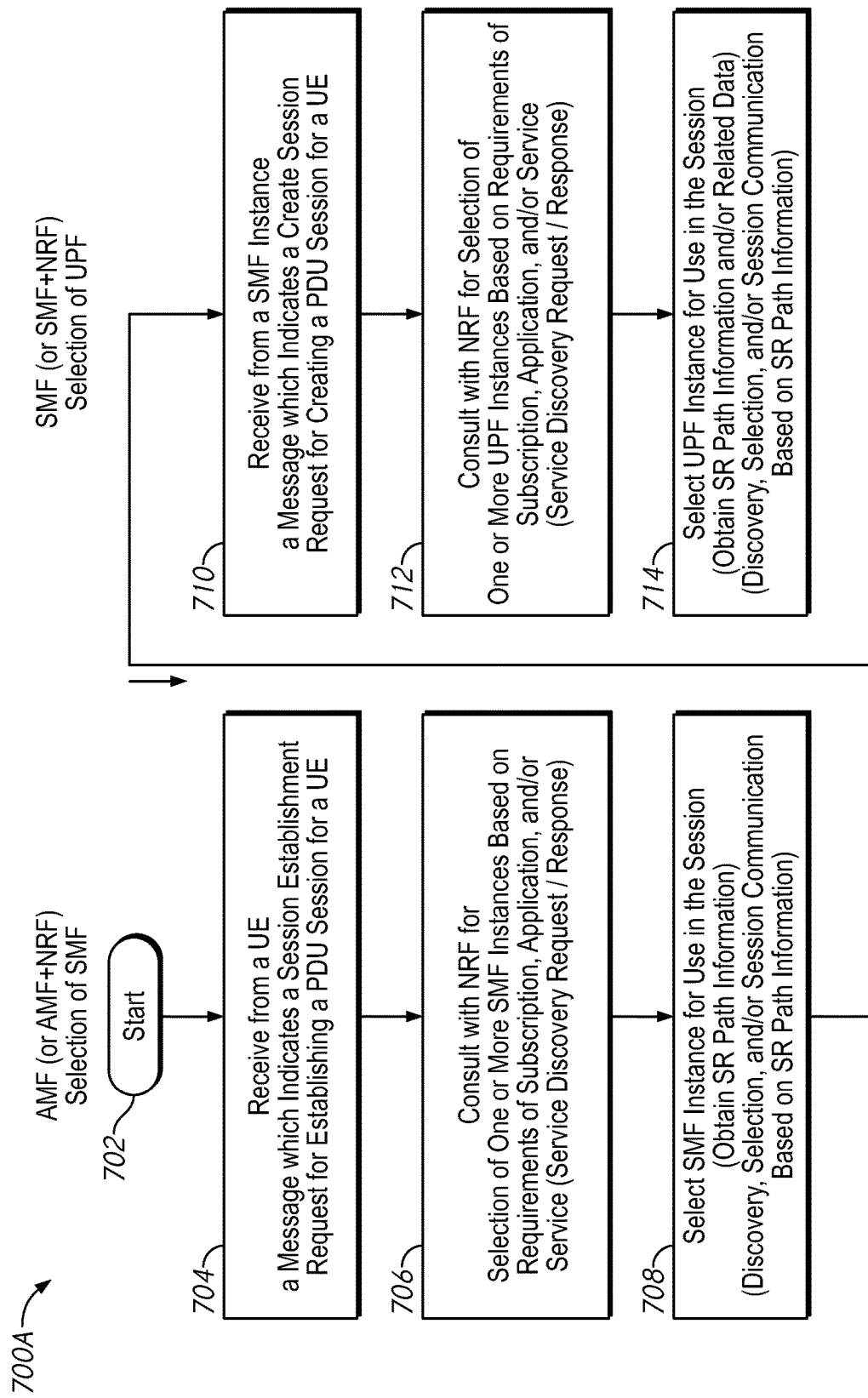
FIG. 7A is a flowchart for describing a method of selecting NF instances or nodes in the mobile network (e.g. SMF and UPF selection) for establishing a session for a UE, which may include the obtaining and/or use of SR path information associated with SR paths.

FIG. 7A is a flowchart 700A for describing a method of selecting NF instances or nodes in the mobile network (e.g. SMF and UPF selection) for establishing a session for a UE, which may include the obtaining and/or use of SR path information associated with SR paths. The method may be performed at one or more mobility nodes, such as one or more NF or NRF nodes (e.g. an AMF, SMF, and/or NRF, e.g., as described). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Beginning at a start block 700A of FIG. 7A, an AMF may receive a message which indicates a session establishment request for establishing a PDU session for a UE (step 704 of FIG. 7A). In response, the AMF may consult with an NRF (e.g. an NRF of FIGS. 3-4) for discovery of one or more SMF instances that may be appropriate for use in the session (step 706 of FIG. 7A). The one or more SMF instances may be discovered based on at least one service, application, or subscription requirement obtained according to the request. An SMF instance may be selected for use in the session for the UE (step 708 of FIG. 7A). Here, SR path information associated with one or more SR paths involving use of the selected SMF instance may be obtained. In addition, or as an alternative, discovery and/or selection of the SMF may be based on SR path information for an SR path associated with the SMF (e.g. a calculated parameter of the SR path, or alternatively an identifier, a SID, or a SID list of the SR path). Once the SMF is identified, the AMF may send a message to the SMF. Communication between the AMF and the selected SMF may be facilitated with use of SR path information (e.g. one or more SIDs or a SID list) for the SR path received in association with the discovered SMF instance in the discovery response.

The SMF may receive the message from the AMF (step 710 of FIG. 7A). The message may indicate a create session request for establishing a PDU session for the UE. In response, the SMF may consult with the NRF for discovery of one or more UPF instances that may be appropriate for use in the session (step 712 of FIG. 7A). The one or more UPF instances may be discovered based on at least one service, application, or subscription requirement obtained according to the request. A UPF instance may be selected for use in the session for the UE (step 714 of FIG. 7A). Here, SR path information associated with one or more SR paths involving use of the selected UPF instance may be obtained. In addition, or as an alternative, discovery and/or selection of the UPF may be based on SR path information for an SR path associated with the UPF (e.g. a calculated parameter of the SR path, or alternatively an identifier, a SID, or a SID list of the SR path). Communication between the SMF and the selected UPF may be facilitated with use of SR path information (e.g. one or more SIDs or a SID list) for the SR path received in association with the discovered UPF instance in the discovery response.

Figure 7B:
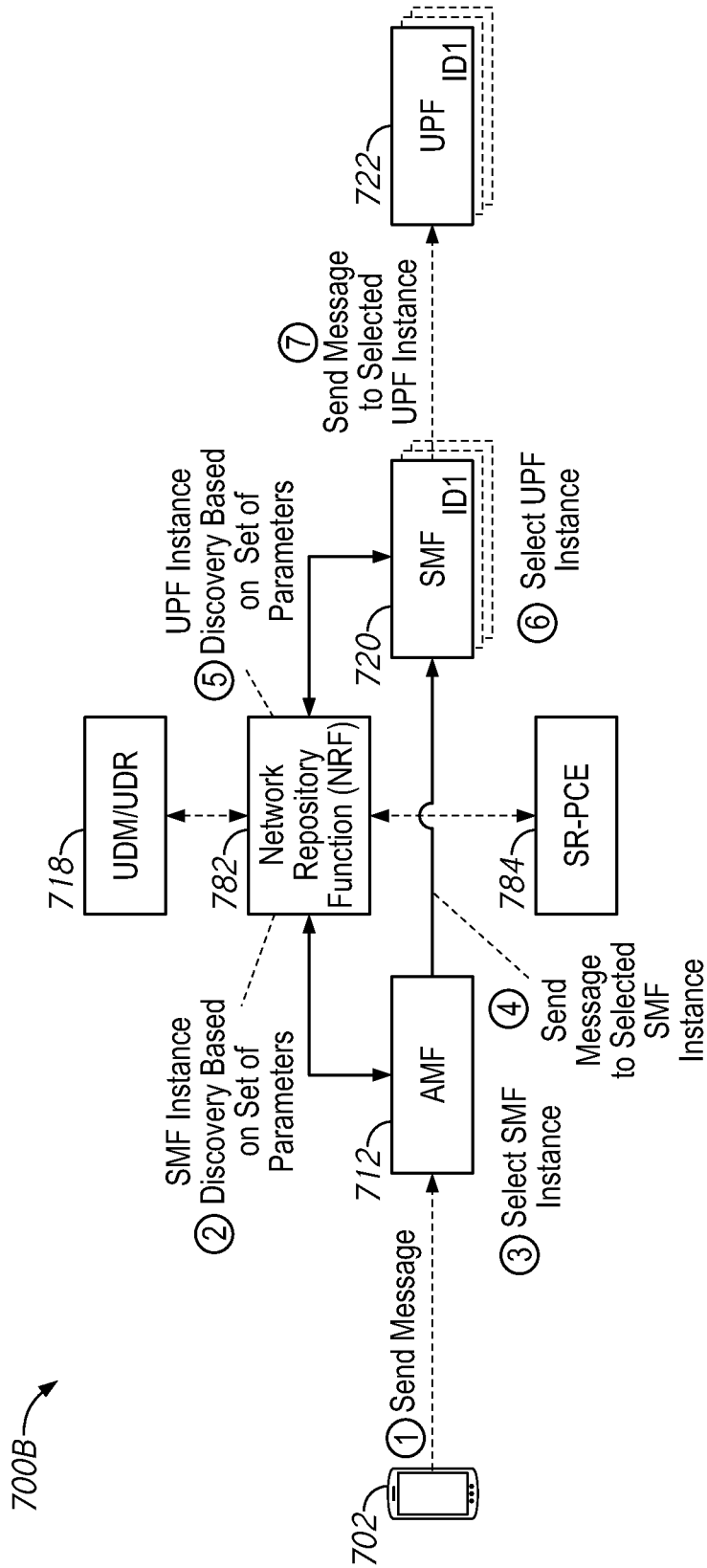
FIG. 7B is a flow diagram for describing a method of selecting NF instances or nodes in the mobile network (e.g. SMF and UPF selection) for establishing a session for a UE, which may include the obtaining and/or use of SR path information associated with SR paths.

FIG. 7B is a flow diagram 700B which may better illustrate the method described above in relation to FIG. 7A. A UE 702 may send a message to the network for service. In turn, an AMF 712 may receive a message which indicates a session establishment request for establishing a PDU session for the UE (step 1 of FIG. 7B). In response, the AMF 712 may consult with an NRF 782 for discovery of one or more SMF instances that may be appropriate for use in the session (step 2 of FIG. 7B). The discovery may be performed based on at least one service, application, or subscription requirement obtained according to the request. At least some data items indicating such requirements may be obtained from a UDM/UDR 718. An SMF instance may be selected for use in the session for the UE (step 3 of FIG. 7A). Here, SR path information associated with one or more SR paths involving use of the selected SMF instance may be obtained.

The AMF 712 may send a message to the selected SMF (step 4 of FIG. 7A). The selected SMF may receive the message from the AMF. The message may indicate a create session request for establishing a PDU session for the UE. In response, the SMF may consult with the NRF for discovery of one or more UPF instances that may be appropriate for use in the session (step 5 of FIG. 7B). At least some data items indicating a requirement may be obtained from UDM/UDR 718. A UPF instance may be selected for use in the session for the UE (step 6 of FIG. 7A). Here, SR path information associated with one or more SR paths involving use of the selected UPF instance may be obtained. For example, the SR path information may pertain to one or more SR paths between the SMF node and UPF node, and/or one or more SR paths between serving gNB and UPF nodes.

Figure 8A:
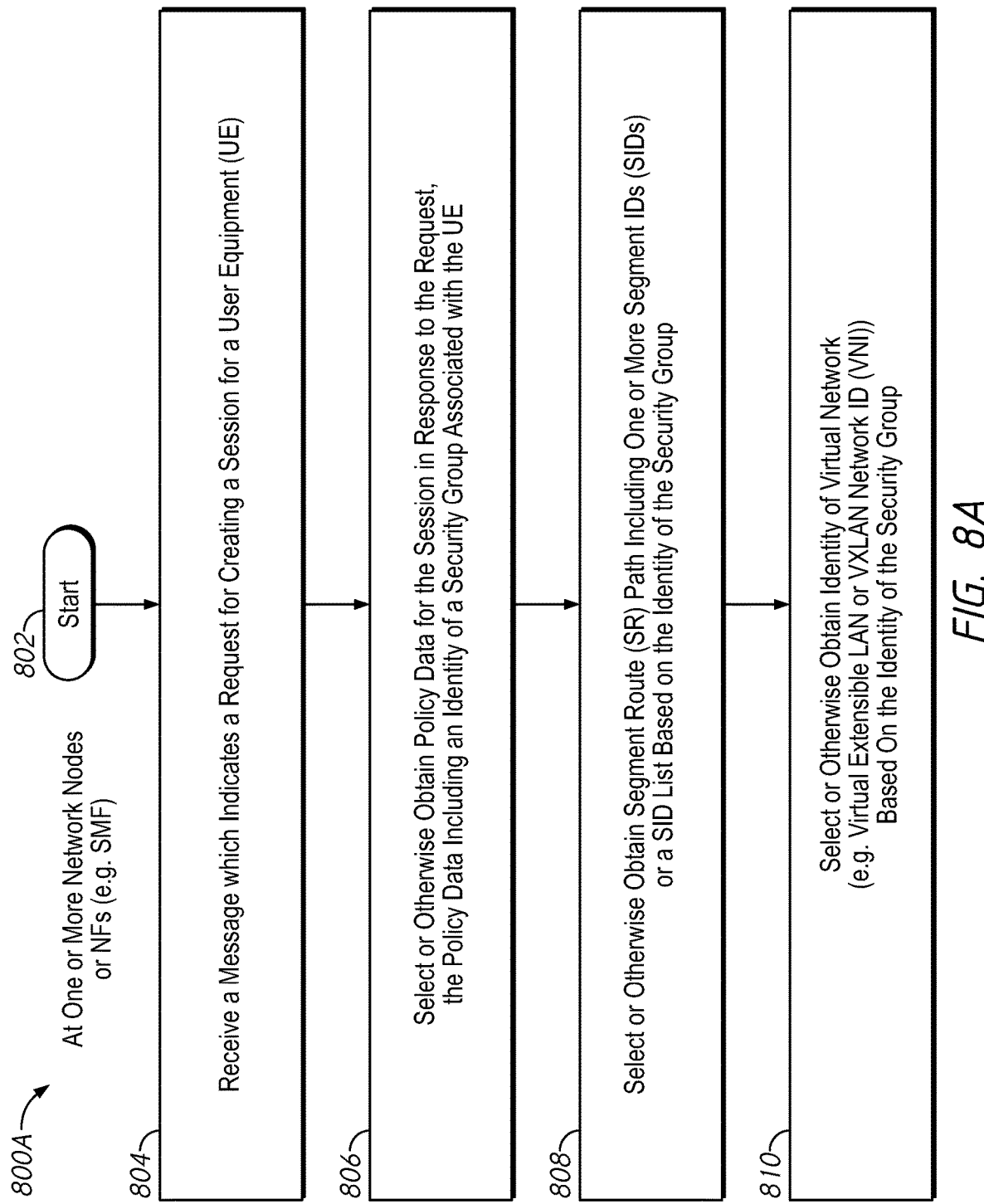
FIG. 8A is a flowchart for describing a method of obtaining an identity of a security group, which may be performed at one or network nodes or functions in a mobile network (e.g. an SMF), for use in at least in some implementations of the present disclosure.

FIG. 8A is a flowchart 800A for describing a method of obtaining an identity of a security group, which may be performed at one or network nodes or functions in a mobile network (e.g. a CP entity for session management or an SMF), for use in at least in some implementations of the present disclosure. The method of FIG. 8A is also for describing a method of selecting or otherwise obtaining a SR path for a session for a UE, and/or selecting or otherwise obtaining an identity of a virtual network, based on the identity of the security group, for use in at least in some implementations of the present disclosure. The method may be performed at one or more mobility nodes, such as one or more NFs (e.g. an SMF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Beginning at a start block 802 of FIG. 8A, a message which indicates a request for creating a session for a user equipment (UE) may be received (step 804 of FIG. 8A). In response, policy data for the session may be selected or otherwise obtained for use in the session (step 806 of FIG. 8A). Notably, the policy data may include an identity of a security group associated with a plurality of UEs which include the requesting UE. In step 806, the policy data may be obtained from a CP entity for policy control or a PCF. The policy data may be selected based on subscription data of a subscription associated with the requesting UE, and/or application data associated with an application of the requesting UE.

A security group may be considered a grouping of users, endpoint devices, and resources that share access control policies. Each security group may be assigned (e.g. by an administrator of an enterprise) with an identity or unique group number (e.g. a unique 160-bit security group number) whose scope is global within a particular domain (e.g. a single enterprise). Packets from a device associated with a security group may be tagged with a security group tag (SGT) that contains the security group number of the security group. As the SGT contains the security group of the source, the tag may be referred to as a source SGT.

The identity of the security group in step 806 may be or include an SGT, security group number, or other related identity, as examples. An SR path (or an identity thereof) for use in the session for the UE may be selected or otherwise obtained based on the identity of the security group (step 808 of FIG. 8A). The SR path may be defined at least in part by one or more Segment IDs (SIDs) or a SID list. An identity of a virtual network for use in the session for the UE may also be selected or otherwise obtained based on the identity of the security group (step 810 of FIG. 8A). In some implementations, the identity of the virtual network may be a virtual extensible LAN (VXLAN) network identifier (VNI) associated with a VXLAN. In alternative implementations, the VNI is provided as part of the policy data obtained in step 806 of FIG. 8A. In general, VXLAN technology provides an overlay network with distinct virtual networks based on the VNI.

More specifically, VXLAN may involve a layer-3 encapsulation protocol that enables appropriately-configured (e.g. MX Series) routers to push layer-2 or layer-3 packets through a VXLAN tunnel to a virtualized data center (or e.g. the Internet). Communication may be established between two virtual tunnel endpoints (VTEPs) (see e.g. VTEPS 1506 and 1508 of FIG. 15 described later below), which may be end hosts or network switches or routers, that encapsulate and de-encapsulate virtual machine (VM) traffic into a VXLAN header. VXLAN may be described as an overlay technology as it allows layer-2 connections to extend over an intervening layer-3 network by encapsulating (tunneling) Ethernet frames in a VXLAN packet that includes IP addresses. Such VXLAN feature may address the needs of a multitenant datacenter, where each tenant's VM may share the physical server with other tenants that are distributed across physical servers within or cross different data centers. This satisfies a need to provide seamless layer-2 connectivity between all the VMs owned by a tenant, in addition to isolating each tenant's traffic for security and potential MAC address overlaps.

Figure 8B:
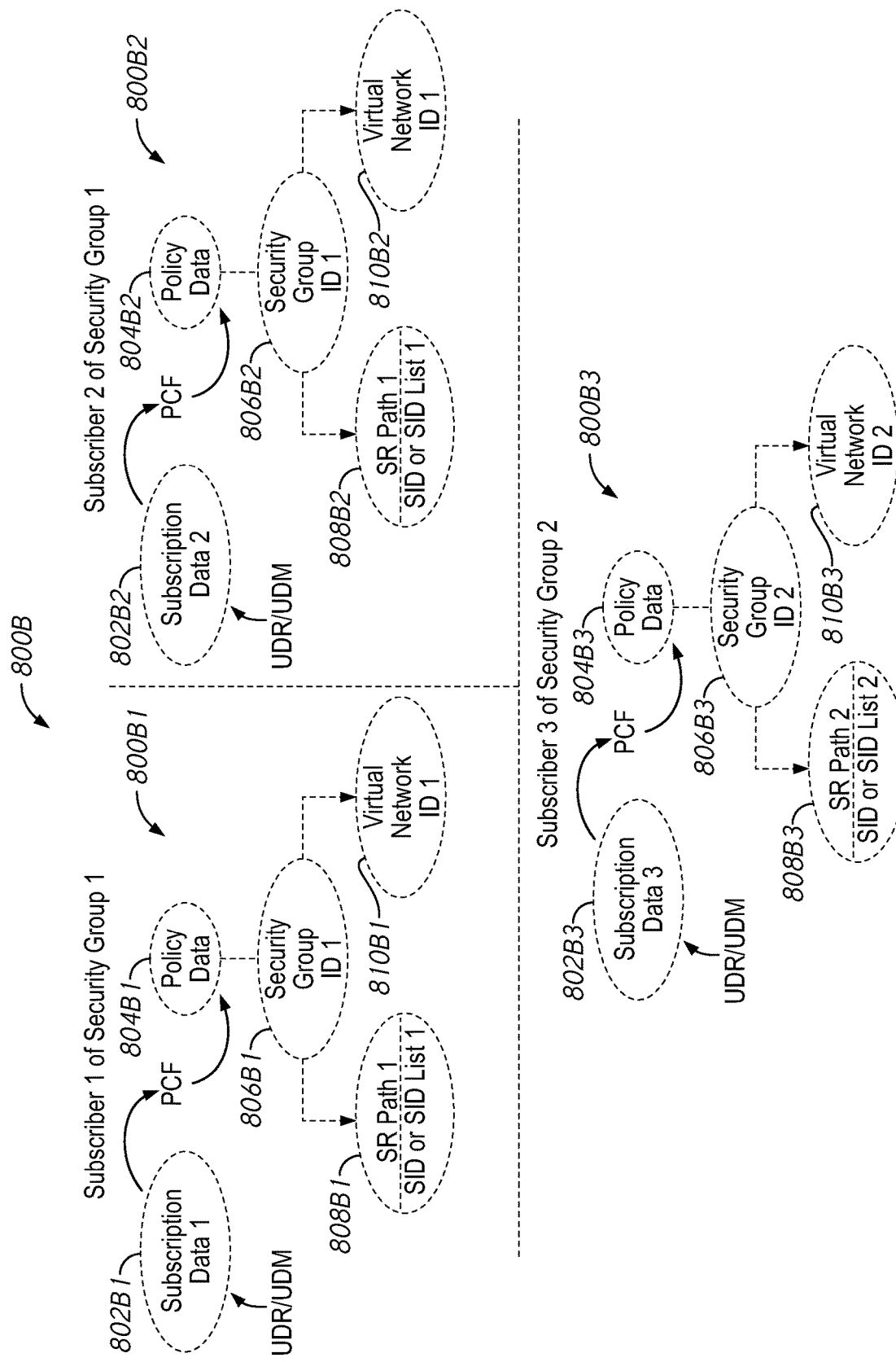
FIG. 8B is a diagram which shows example relationships between an identity of a security group and an SR path and/or virtual network.

FIG. 8B is a diagram 800B which shows example relationships between identities of security groups and SR paths and/or identities of virtual networks. Diagram 800B illustrates data associated with three (3) different subscribers as an example, namely, subscribers 1, 2, and 3. Data for "subscriber 1" is shown in diagram section 800B1, data for "subscriber 2" is shown in diagram section 800B2, and data for "subscriber 3" is shown in diagram section 800B3. Subscribers 1 and 2 are associated with the same security group, i.e. "security group 1." On the other hand, subscriber 3 is associated with a different security group, i.e. "security group 2."

"Subscriber 1" is associated with subscription data 802B1 which is subscription data 1. When a session is created or established, policy data 804B1 is selected, for example, based on the type of session and subscription data 802B1. Security group data 806B1 from policy data 804B1 for "subscriber 1" may include a "security group ID 1." "Security group ID 1" may be associated with SR path information 808B1 which is "SR path 1" and/or "SID 1"/"SID list 1." Thus, "SR path 1" and/or "SID 1"/"SID list 1" may be selected or obtained based on "security group ID 1." Also, virtual network data 810B1 from policy data 804B1 for "subscriber 1" may include a "virtual network ID 1." Thus, "virtual network 1" may be selected or obtained based on "security group ID 1." In alternative implementations, the "virtual network 1" may be provided directed from or as part of the policy data 804B1.

"Subscriber 2 is associated with subscription data 802B2 which is subscription data 2. Again, subscribers 1 and 2 are associated with the same security group. When a session is created or established, policy data 804B2 is selected, for example, based on the type of session and subscription data 802B2. Security group data 806B2 from policy data 804B2 for "subscriber 2" may include the "security group ID 1." "Security group ID 1" may be associated with SR path information 808B2 which is "SR path 1" and/or "SID 1"/"SID list 1." Thus again, "SR path 1" and/or "SID 1"/"SID list 1" may be selected or obtained based on "security group ID 1." Also, virtual network data 810B2 from policy data 804B2 for "subscriber 2" may include a "virtual network ID 1." Thus again, "virtual network 1" may be selected or obtained based on "security group ID 1." Again in alternative implementations, the "virtual network 1" may be provided directed from or as part of the policy data 804B2.

"Subscriber 3" is associated with subscription data 802B3 which is subscription data 3. Subscriber 3 is associated with a different security group than subscribers 1 and 2. When a session is created or established, policy data 804B3 is selected, for example, based on the type of session and subscription data 802B3. Security group data 806B3 from policy data 804B3 for "subscriber 3" may include a "security group ID 2." "Security group ID 2" may be associated with SR path information 808B3 which is "SR path 2" and/or "SID 2"/"SID list 2." Thus, "SR path 2" and/or "SID 2"/"SID list 2" may be selected or obtained based on "security group ID 2." Also, virtual network data 810B3 from policy data 804B3 for "subscriber 3" may include a "virtual network ID 2." Thus, "virtual network 2" may be selected or obtained based on "security group ID 2." In alternative implementations, the "virtual network 2" may be provided directed from or as part of the policy data 804B3.

Figure 9A:
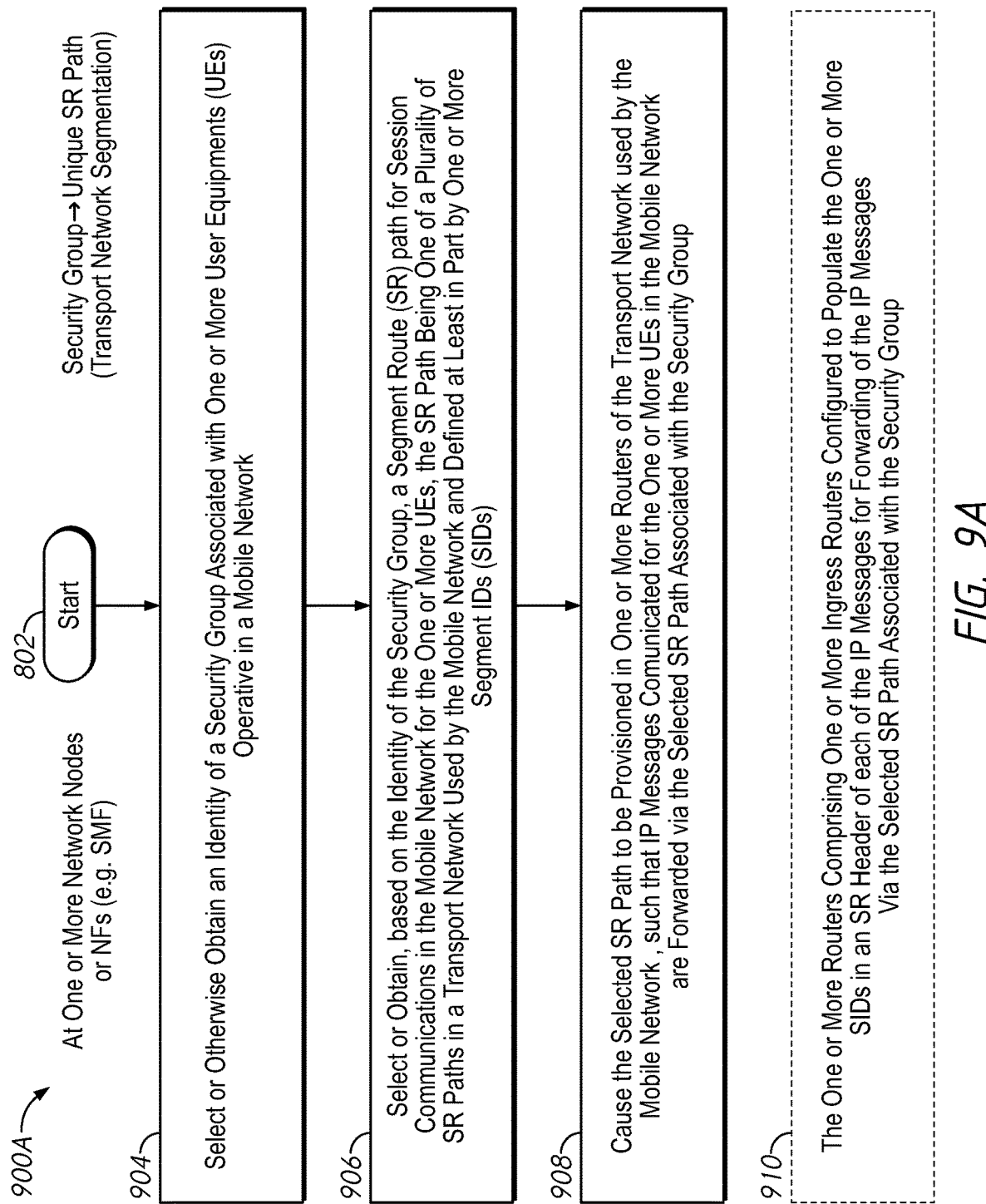
FIG. 9A is a flowchart for describing a method for use in providing transport network segmentation in a mobile network based on security group identity, which may be performed at one or network nodes or functions in the mobile network (e.g. an SMF), according to at least some implementations of the present disclosure.

FIG. 9A is a flowchart for describing a method for use in providing transport network segmentation in a mobile network based on security group identity, which may be performed at one or network nodes or functions in the mobile network (e.g. an SMF), according to at least some implementations of the present disclosure. The method may be performed at one or more mobility nodes, such as one or more NFs (e.g. an SMF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 902 of FIG. 9A, an identity of the security group associated with the one or more UEs may be selected or otherwise obtained (step 904 of FIG. 9A). The identity of the security group may be or include an SGT, security group number, or other related identity, as examples. An SR path for session communications for the one or more UEs may then be selected or otherwise obtained based on the identity of the security group (step 906 of FIG. 9A). The SR path may be one of a plurality of SR paths in a transport network used by the mobile network and defined at least in part by one or more SIDs. The selected SR path (i.e. the selected one or more SIDs or SID list) may then be provisioned in one or more routers of the transport network used by the mobile network (step 908 of FIG. 9A). After such provisioning, IP messages communicated for the one or more UEs in the mobile network may be forwarded via the selected SR path associated with the security group. The one or more routers may be configured receive the IP messages and populate an SR header of the IP messages with the one or more SIDs of the selected SR path, for forwarding the IP messages via the selected SR path associated with the security group (see information box 910 of FIG. 9A).

Figure 9B:
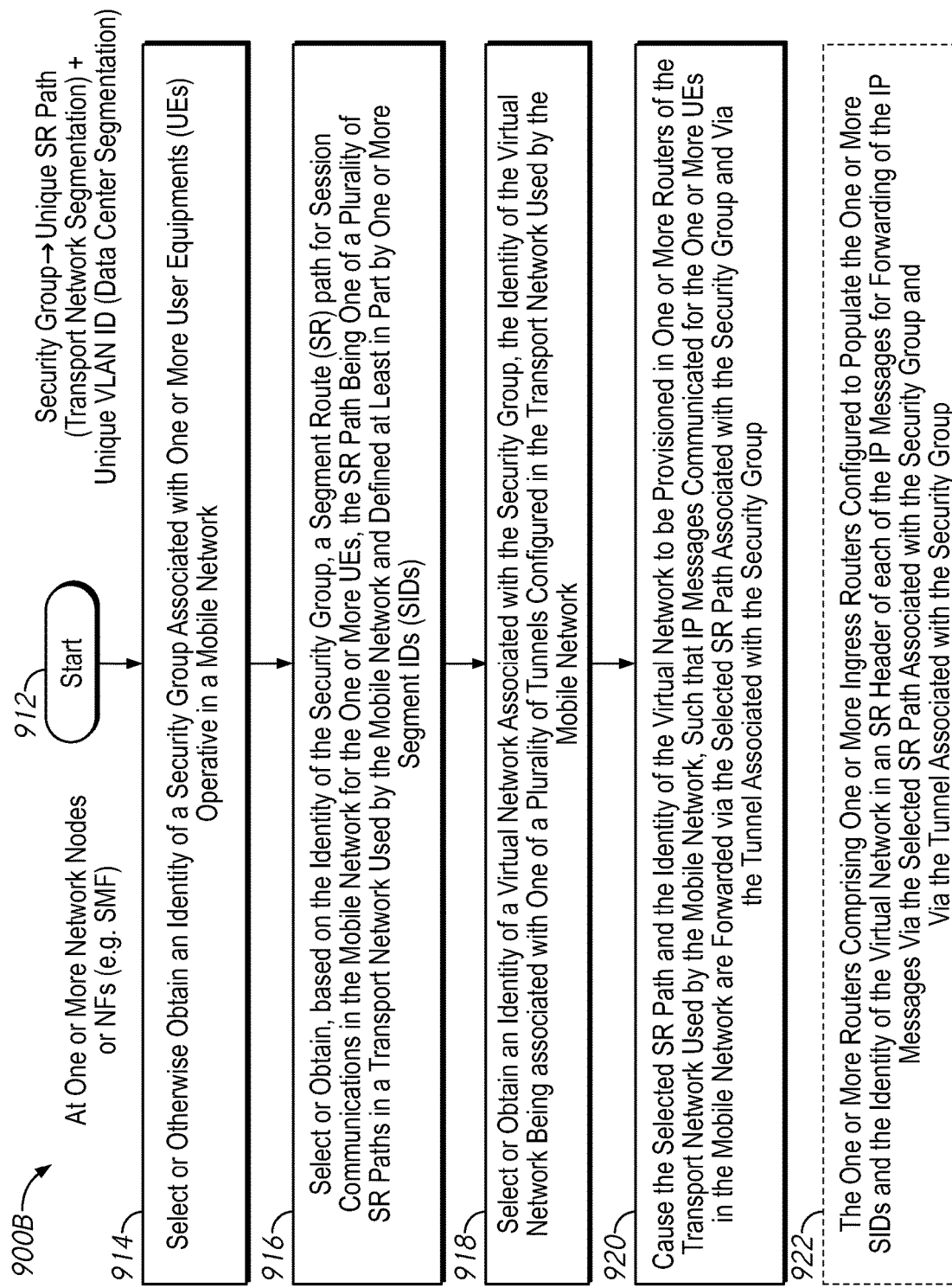
FIG. 9B is a flowchart for describing a method for use in providing transport and data center segmentation in a mobile network based on security group identity, which may be performed at one or network nodes or functions in the mobile network (e.g. an SMF), according to at least some implementations of the present disclosure.

FIG. 9B is a flowchart for describing a method for use in providing transport and data center segmentation in a mobile network based on security group identity, which may be performed at one or network nodes or functions in the mobile network (e.g. an SMF), according to at least some implementations of the present disclosure. The method may be performed at one or more mobility nodes, such as one or more NFs (e.g. an SMF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 912 of FIG. 9B, an identity of the security group associated with the one or more UEs may be selected or otherwise obtained (step 914 of FIG. 9B). The identity of the security group may be or include an SGT, security group number, or other related identity, as examples. An SR path for session communications for the one or more UEs may then be selected or otherwise obtained based on the identity of the security group (step 916 of FIG. 9B). The SR path may be one of a plurality of SR paths in a transport network used by the mobile network and defined at least in part by one or more SIDs. An identity of a virtual network may also be selected or otherwise obtained based on the identity of the security group (step 918 of FIG. 9B). The virtual network may be associated with one of a plurality of tunnels configurable in the transport network used by the mobile network.

The selected SR path (i.e. the selected one or more SIDs or SID list) and the identity of the virtual network may then be provisioned in one or more routers of the transport network used by the mobile network (step 920 of FIG. 9B). After such provisioning, IP messages communicated for the one or more UEs in the mobile network may be forwarded via the selected SR path associated with the security group and (eventually) via the tunnel associated with the security group. Here, the one or more routers may be configured receive the IP messages and populate an SR header of the IP messages with the one or more SIDs of the selected SR path and the identity of the virtual network (see information box 922 of FIG. 9B). A succeeding network node (e.g. a UPF) may extract the identity of the virtual network from the SR header and populate an L2 header of a corresponding IP message for subsequent tunneling. See e.g. FIGS. 13A-13B and 15-16 discussed later below.

Figure 10A:
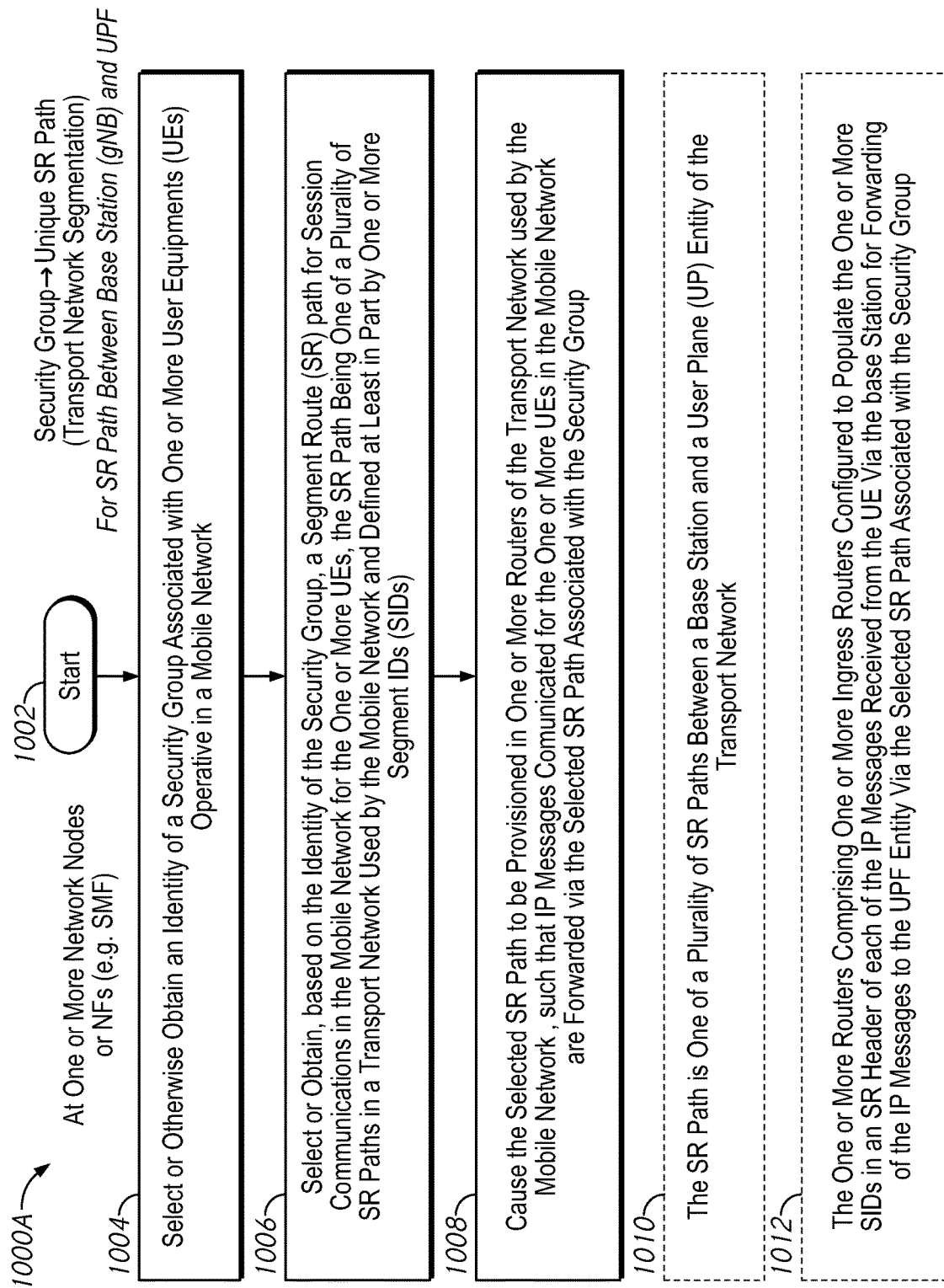
FIG. 10A is a flowchart for describing a method for use in providing transport network segmentation in a mobile network based on security group identity, which is similar to FIG. 9A but described in the context of a plurality of candidate SR paths between a gNB and a UPF for a session for a UE of the security group, according to at least some implementations of the present disclosure.

FIG. 10A is a flowchart 1000A for describing a method for use in providing transport network segmentation in a mobile network based on security group identity, which is similar to FIG. 9A but described in the context of a plurality of candidate SR paths between a gNB and a UPF for a session for a UE of the security group, according to at least some implementations of the present disclosure. Again, the method may be performed at one or more mobility nodes, such as one or more NFs (e.g. an SMF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 10002 of FIG. 10A, an identity of the security group associated with the one or more UEs may be selected or otherwise obtained (step 1004 of FIG. 10A). The identity of the security group may be or include an SGT, security group number, or other related identity, as examples. An SR path for session communications for the one or more UEs may then be selected or otherwise obtained based on the identity of the security group (step 1006 of FIG. 10A). The SR path may be one of a plurality of SR paths in a transport network used by the mobile network and defined at least in part by one or more SIDs. More particularly, the SR path may be one of a plurality of SR paths between a base station (e.g. the gNB serving the UE) and a (selected) user plane (UP) entity or UPF (see information box 1010 of FIG. 10A). The selected SR path (i.e. the selected one or more SIDs or SID list) between the gNB and the UPF may then be provisioned in one or more routers of the transport network used by the mobile network (step 1008 of FIG. 10A). The one or more routers may be ingress routers between the gNB and the UPF. After such provisioning, IP messages communicated for the one or more UEs in the mobile network may be forwarded via the selected SR path associated with the security group. The one or more ingress routers may be configured receive the IP messages and populate an SR header of the IP messages with the one or more SIDs of the selected SR path, for forwarding the IP messages via the selected SR path associated with the security group to the UPF (see information box 1012 of FIG. 10A). See e.g. FIGS. 13A-13B and 15-16 discussed later below.

Figure 10B:
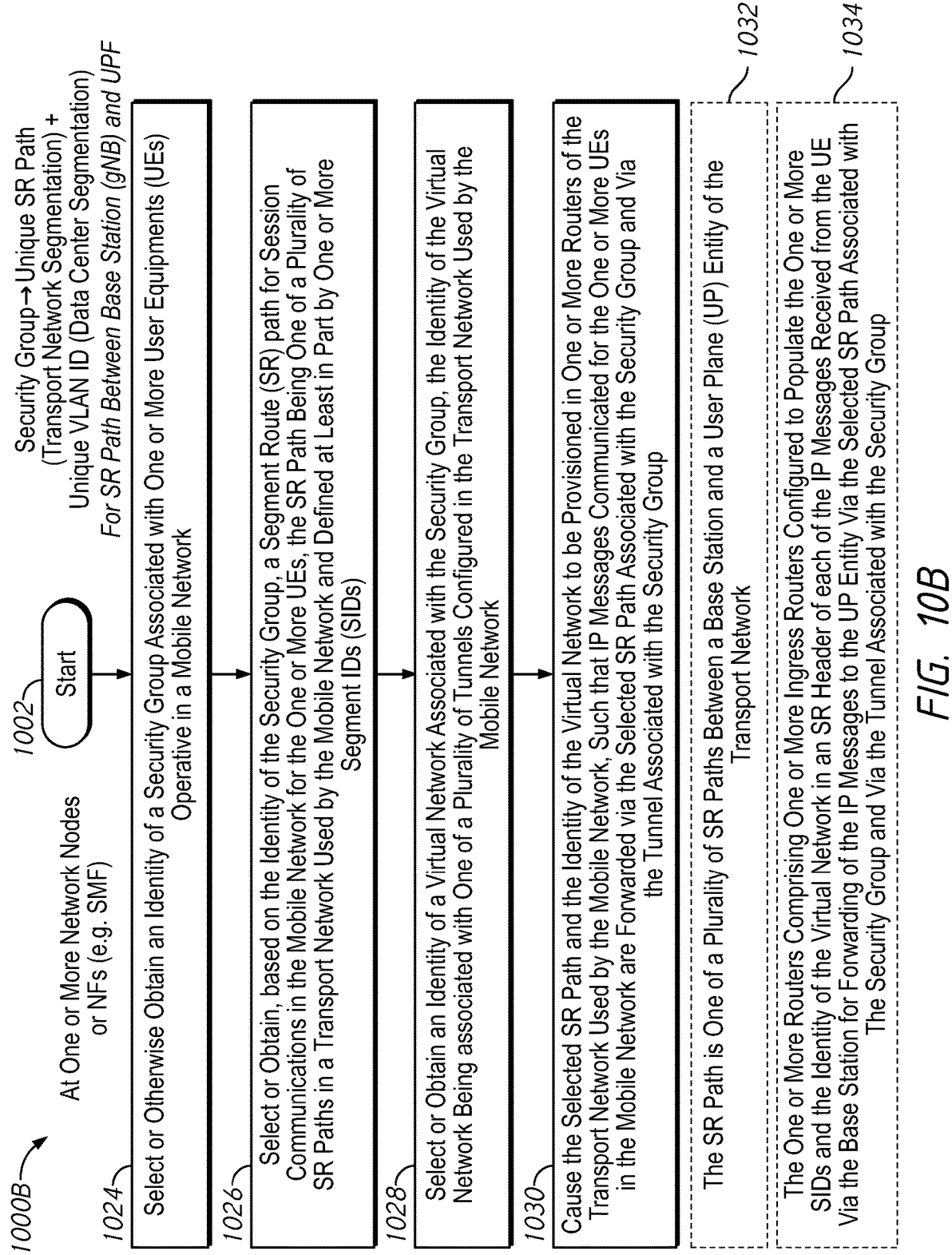
FIG. 10B is a flowchart for describing a method for use in providing transport and data center segmentation in a mobile network based on security group identity, which is similar to FIG. 9B but described in the context of the plurality of candidate SR paths for the UE between the gNB and the UPF for a session for a UE of the security group, according to at least some implementations of the present disclosure.

FIG. 10B is a flowchart for describing a method for use in providing transport and data center segmentation in a mobile network based on security group identity, which is similar to FIG. 9B but described in the context of the plurality of candidate SR paths for the UE between the gNB and the UPF for a session for a UE of the security group, according to at least some implementations of the present disclosure. Again, the method may be performed at one or more mobility nodes, such as one or more NFs (e.g. an SMF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 1022 of FIG. 10B, an identity of the security group associated with the one or more UEs may be selected or otherwise obtained (step 1024 of FIG. 10B). The identity of the security group may be or include an SGT, security group number, or other related identity, as examples. An SR path for session communications for the one or more UEs may then be selected or otherwise obtained based on the identity of the security group (step 1026 of FIG. 10B). The SR path may be one of a plurality of SR paths in a transport network used by the mobile network and defined at least in part by one or more SIDs. More particularly, the SR path may be one of a plurality of SR paths between a base station (e.g. the gNB serving the UE) and a (selected) user plane (UP) entity or UPF (see information box 1032 of FIG. 10B). An identity of a virtual network may also be selected or otherwise obtained based on the identity of the security group (step 1028 of FIG. 10B). The virtual network may be associated with one of a plurality of tunnels configurable in the transport network used by the mobile network.

The selected SR path (i.e. the selected one or more SIDs or SID list) between the gNB and the UPF, and the identity of the virtual network, may then be provisioned in one or more routers of the transport network used by the mobile network (step 1030 of FIG. 10B). After such provisioning, IP messages communicated for the one or more UEs in the mobile network may be forwarded via the selected SR path associated with the security group and (eventually) via the tunnel associated with the security group. Here, the one or more routers may be configured receive the IP messages and populate an SR header of the IP messages with the one or more SIDs of the selected SR path and the identity of the virtual network (see information box 1034 of FIG. 10B). A succeeding network node (e.g. a UPF) may extract the identity of the virtual network from the SR header and populate an L2 header of a corresponding IP message for subsequent tunneling. See e.g. FIGS. 13A-13B and 15-16 discussed later below.

Figure 11:
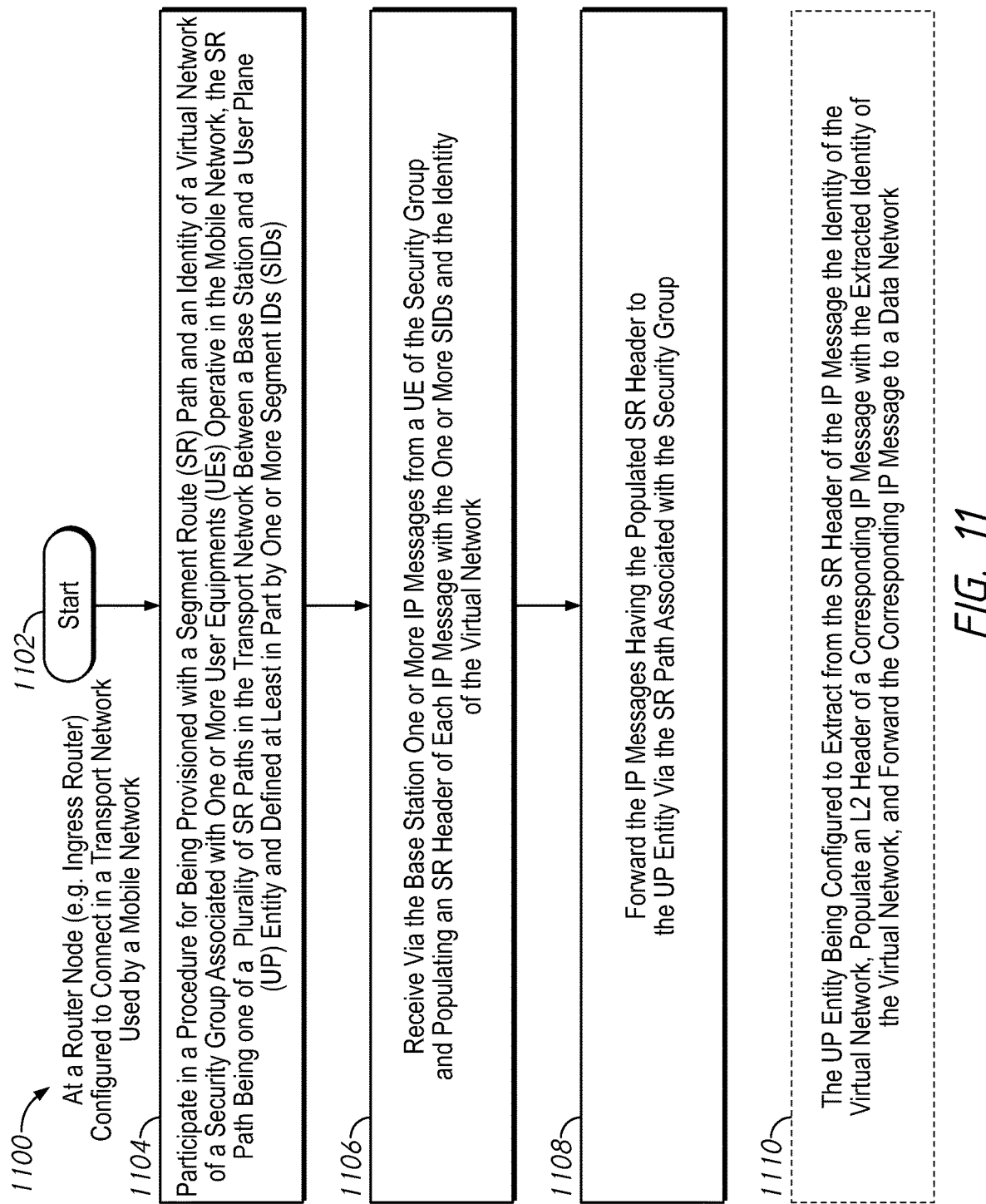
FIG. 11 is a flowchart for describing a method for use in providing transport and data center segmentation in a mobile network, which may be performed at one or router nodes in the mobile network (e.g. an ingress router), according to at least some implementations of the present disclosure.

FIG. 11 is a flowchart 1100 for describing a method for use in providing transport and data center segmentation in a mobile network according to at least some implementations of the present disclosure. The method may be performed at one or router nodes (e.g. an ingress router to a UP entity or UPF) configured to connect in a transport network used by a mobile network. The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 1102 of FIG. 11, the router node may participate in a procedure for being provisioned with a segment route (SR) path and an identity of a virtual network of the security group associated with the one or more UEs (step 1104 of FIG. 11). The SR path may be one of a plurality of SR paths in the transport network between a base station (e.g. gNB) and a user plane (UP) entity (e.g. UPF) and defined at least in part by one or more segment IDs (SIDs). The identity of the virtual network may be a virtual extensible LAN (VXLAN) network identifier (VNI) associated with a VXLAN. The router node may receive via the base station one or more IP messages from a UE of the security group, and populate an SR header of the IP message with the one or more SIDs of the selected SR path and the identity of the virtual network (step 1106 of FIG. 11). The router node may forward the IP message having the populated SR header to the UP entity via the SR path according to the one or more SIDs (step 1108 of FIG. 11). Here, the UPF may be configured to receive the IP message, extract from the SR header of the IP message the identity of the virtual network, populate an L2 header of a corresponding IP message with the extracted identity of the virtual network, and forward the corresponding IP message to a data network (step 1110 of FIG. 11). See e.g. FIGS. 13A-13B and 15-16 discussed later below.

Figure 12:
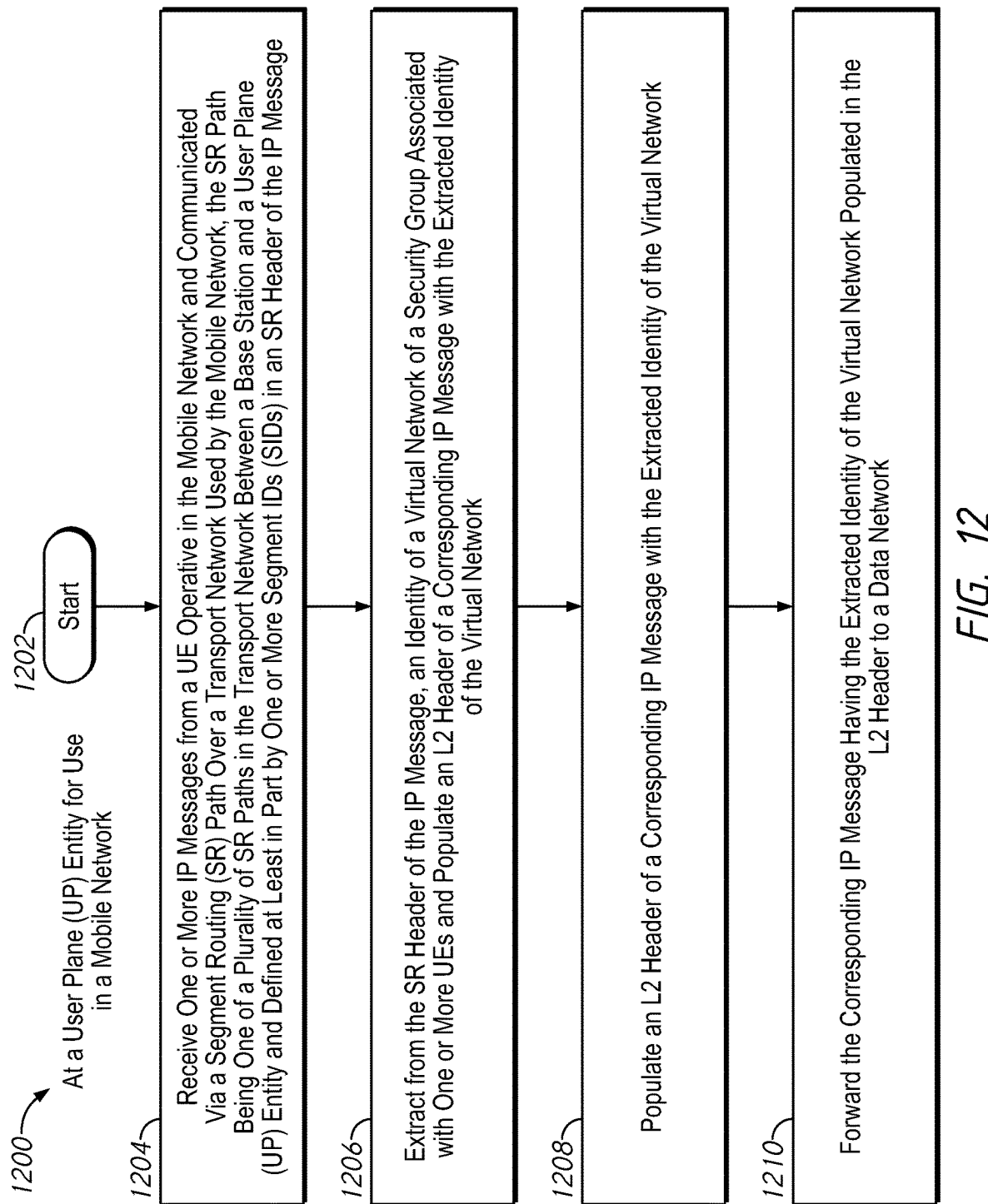
FIG. 12 is a flowchart for describing a method for use in providing transport and data center segmentation in a mobile network, which may be performed at one more user plane (UP) entities in the mobile network (e.g. UPFs), according to at least some implementations of the present disclosure.

FIG. 12 is a flowchart 1200 for describing a method for use in providing transport and data center segmentation in a mobile network, which may be performed at one more user plane (UP) entities in the mobile network (e.g. UPFs), according to at least some implementations of the present disclosure. The method may be performed at one or more mobility nodes, such as one or more NFs (e.g. a UPF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

One or more UEs associated with a security group may operate in a mobile network. Beginning at a start block 1200 of FIG. 12, one or more IP messages from one of the UEs may be received (step 1204 of FIG. 12). The IP message may have been communicated via a segment routing (SR) path over a transport network used by the mobile network. The SR path may be one of a plurality of SR paths in the transport network between a base station (e.g. gNB) and a user plane (UP) entity (e.g. UPF), and defined at least in part by one or more segment IDs (SIDs) in an SR header of the IP message. An identity of a virtual network of the security group may be extracted from the SR header of the IP message (step 1206 of FIG. 12). An L2 header of a corresponding IP message may be populated with the extracted identity of the virtual network (step 1208 of FIG. 12). The corresponding IP message having the extracted identity of the virtual network may be forwarded to a data network (step 1210 of FIG. 12). See e.g. FIGS. 13A-13B and 15-16 discussed later below.

According to some implementations of the techniques of FIGS. 9A, 9B, 10A, 10B, 11, and 12 described above as well as elsewhere herein, it is understood that the routers may be pre-provisioned with the SR paths of the security groups and the SGT and VXLAN then associated with them as described.

Figure 13:
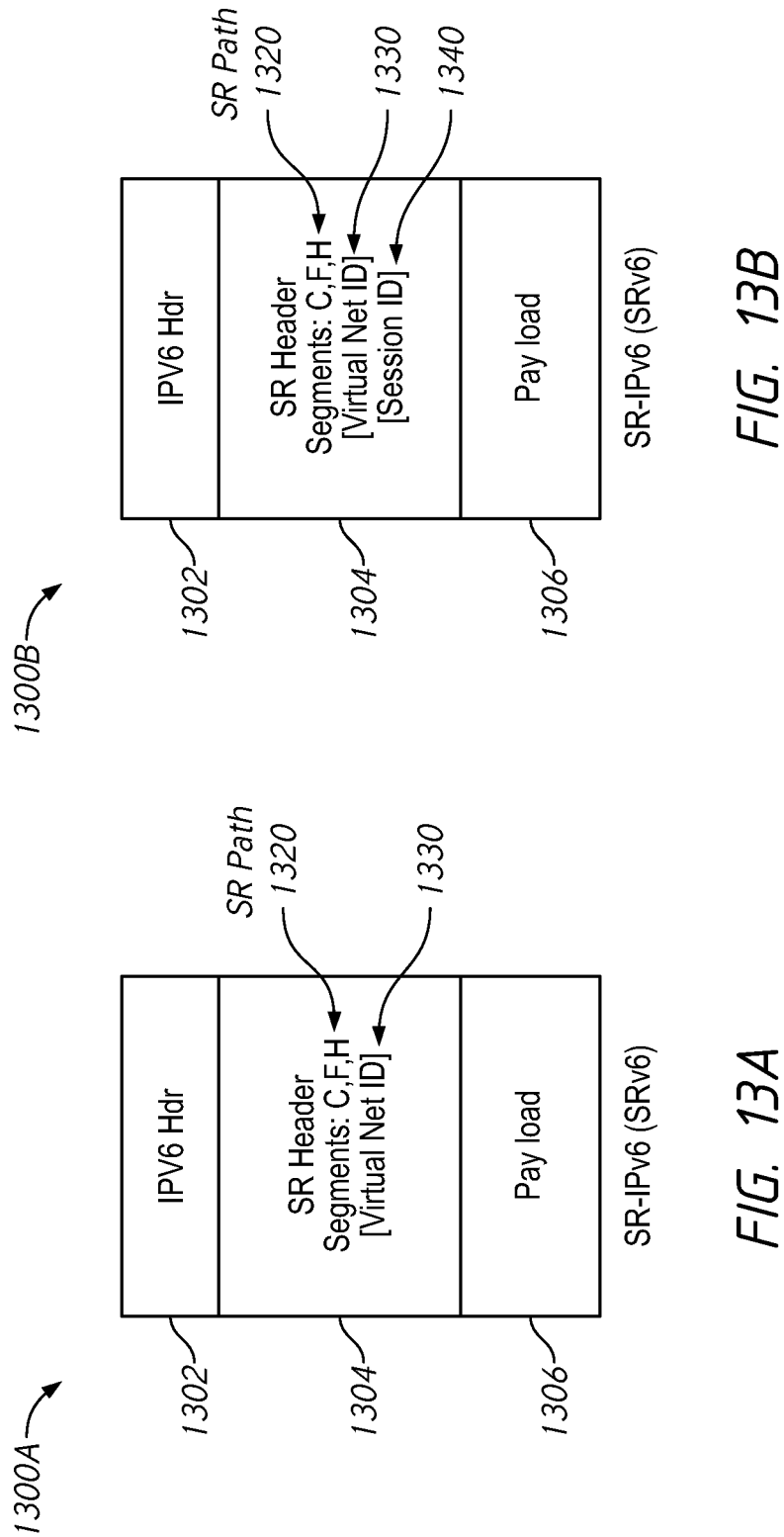
FIG. 13A is a message format of an SRv6 message having an SR header which may be populated with one or more segment IDs (SIDs) of an SR path and an identity of a virtual network associated with a security group.
FIG. 13B is the message format of an SRv6 message of FIG. 13A, where the SR header may further include a session ID of a session.

FIG. 13A is a message format of an SRv6 message 1300A having an IPv6 header 1302, an SR header 1306, and a payload 1306. SR header 1304 may be populated with an SR path 1320 which includes one or more segment IDs (SIDs) associated with a security group, as well as an identity 1330 of a virtual network associated with the security group. FIG. 13B is the message format of an SRv6 message 1300B which is the same as that of FIG. 13A, but where SR header 1320 may further include a session ID 1332 of a session of the UE.

Figure 14:
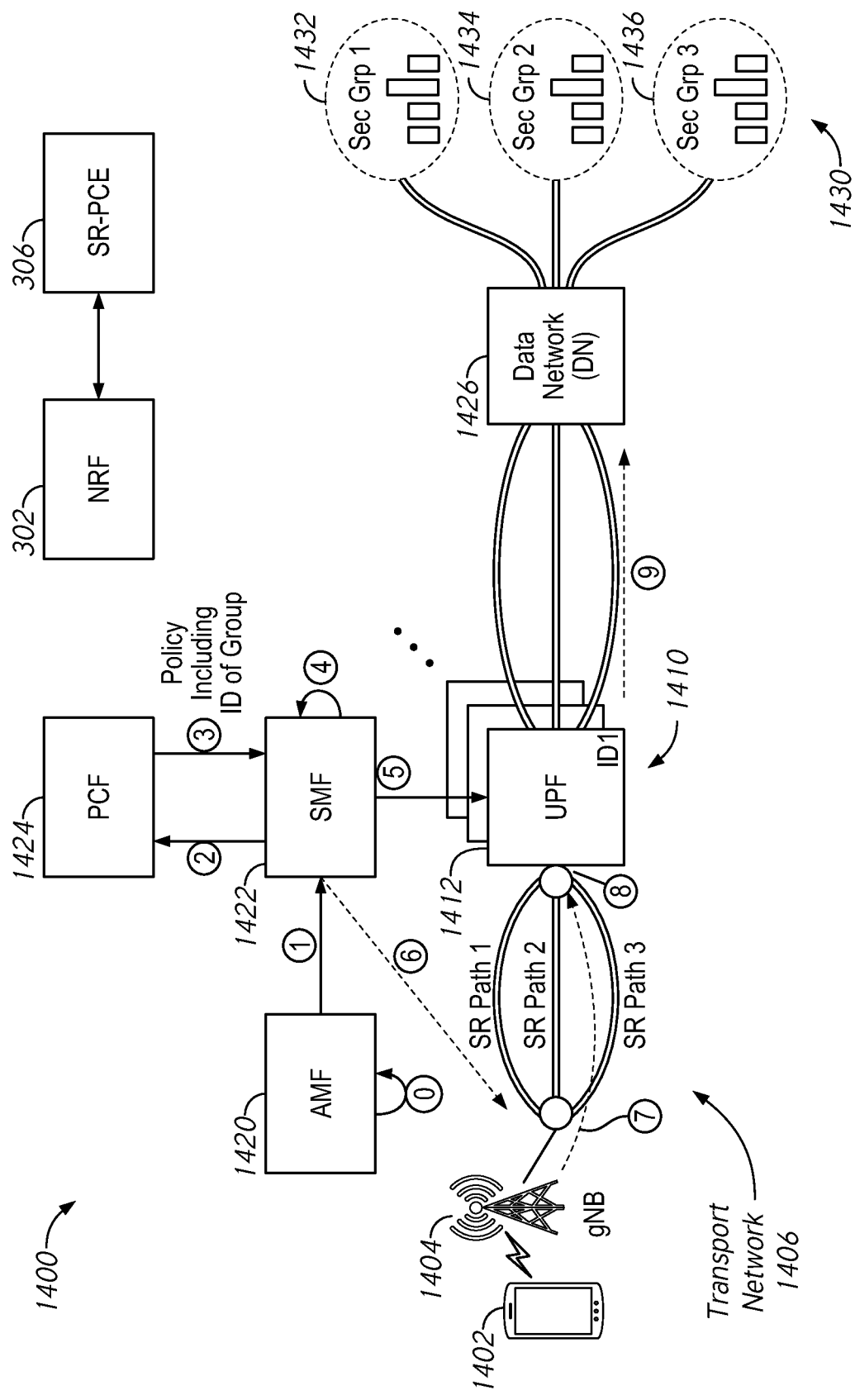
FIG. 14 is a flow diagram which is provided in context with an illustrative example arrangement of network nodes or functions of a mobile network, for describing a method for use in providing transport and data center segmentation based on security group identity, according to at least some implementations of the present disclosure.

FIG. 14 is a flow diagram 1400 which is provided in context with an illustrative example arrangement of network nodes or functions of a mobile network, for describing a method for use in providing transport and data center segmentation based on security group identity, according to at least some implementations of the present disclosure.

The arrangement in the flow diagram 1400 of FIG. 14 includes a gNB 1404, an AMF 1420, an SMF 1422, and a PCF 1422. The arrangement also includes a gNB 1404 and a UPF 1412 (of a plurality of UPFs) for session communications for a UE 1402 over one of a plurality of candidate SR paths (e.g. 1, 2, and 3) of a transport network 1406. Communications may extend beyond UPF 1412 through a data network 1426 to a data center 1430.

With VXLAN technology, a data center 1430 may be segmented into a plurality of security groups 1432, 1434, and 1436 (designated as "Sec Grp 1," "Sec Grp 2," and "Sec Grp 3," respectively). Again, VXLAN may be considered a layer-3 encapsulation protocol that enables appropriately-configured routers to push layer-2 or layer-3 packets through a VXLAN tunnel to a virtualized data center. Communication may be established between two VTEPs (see e.g. VTEPs 1506 and 1508 of FIG. 15 described later below), which may be end hosts or network switches or routers, that encapsulate and de-encapsulate VM traffic into a VXLAN header. VXLAN may be described as an overlay technology as it allows layer-2 connections to extend over an intervening layer-3 network by encapsulating (tunneling) Ethernet frames in a VXLAN packet that includes IP addresses. Such VXLAN feature may address needs of a multitenant datacenter, where each tenant's VM may share the physical server with other tenants that are distributed across physical servers within or cross different data centers.

UE 1402 may be associated with one of the security groups (e.g. a security group 3 or "SecGrp3"). UE 1402 may access the mobile network via gNB 1404 for service. AMF 1420 may select one of a plurality of SMFs for a session for UE 1402, consulting NRF 302 where necessary (step 0 of FIG. 14). AMF 1420 may send to the selected SMF 1422 a message which indicates a request to establish a session (step 1 of FIG. 14). The selected SMF 1422 may send to PCF 1424 a message indicating a request for policy data for the session (step 2 of FIG. 14) and may receive policy data in response (step 3 of FIG. 14). The policy data may include the identity of the security group associated with UE 1402. The identity of the security group may be or include an SGT or security group number. SMF 1422 may select an appropriate UPF 1412 of the network slice based on the policy data and other relevant data (step 4 of FIG. 14). SMF may send to the selected UPF 1412 a message which indicates a request to create a session (step 5 of FIG. 14).

Also here, SMF 1422 may select or otherwise obtain SR path information based on the identity of the security group. The SR path information may be or include an identifier of an SR path which defined at least in part by one or more SIDs or a SID list, and/or the one or more SIDs or SID list that defines the SR path. Here, SMF 1422 may consult with NRF 302 if needed. SMF 1422 may also select or otherwise obtain an identity of a virtual network (e.g. an identity of a VXLAN or VNI) based on the identity of the security group. SMF 1422 (or other SR type controller) may cause one or more routers to be provisioned with the SR path information and the identity of the virtual network (step 6 of FIG. 14). In some implementations, the routers may be pre-provisioned with the SR paths, and the SGT and/or VXLAN may be associated with them as described.

A message (e.g. an IP message) for UE 1402 may be communicated via transport network 1406 via the selected SR path of the security group (step 7 of FIG. 14). For each IP message forwarded to the selected UPF 1412, the UPF 1412 may receive the IP message, extract from the SR header of the IP message the identity of the virtual network, populate an L2 header of a corresponding IP message with the extracted identity of the virtual network, and forward the corresponding IP message to a data network (step 9 of FIG. 9). Data center 1430 may receive the corresponding IP message and provide segmenting (e.g. security groups 1432, 1434, 1436) based on the identity of the virtual network. In the data center 1430, the message from UE 1402 may be associated with security group 1436 or "Sec Grp 3."

Figure 15:
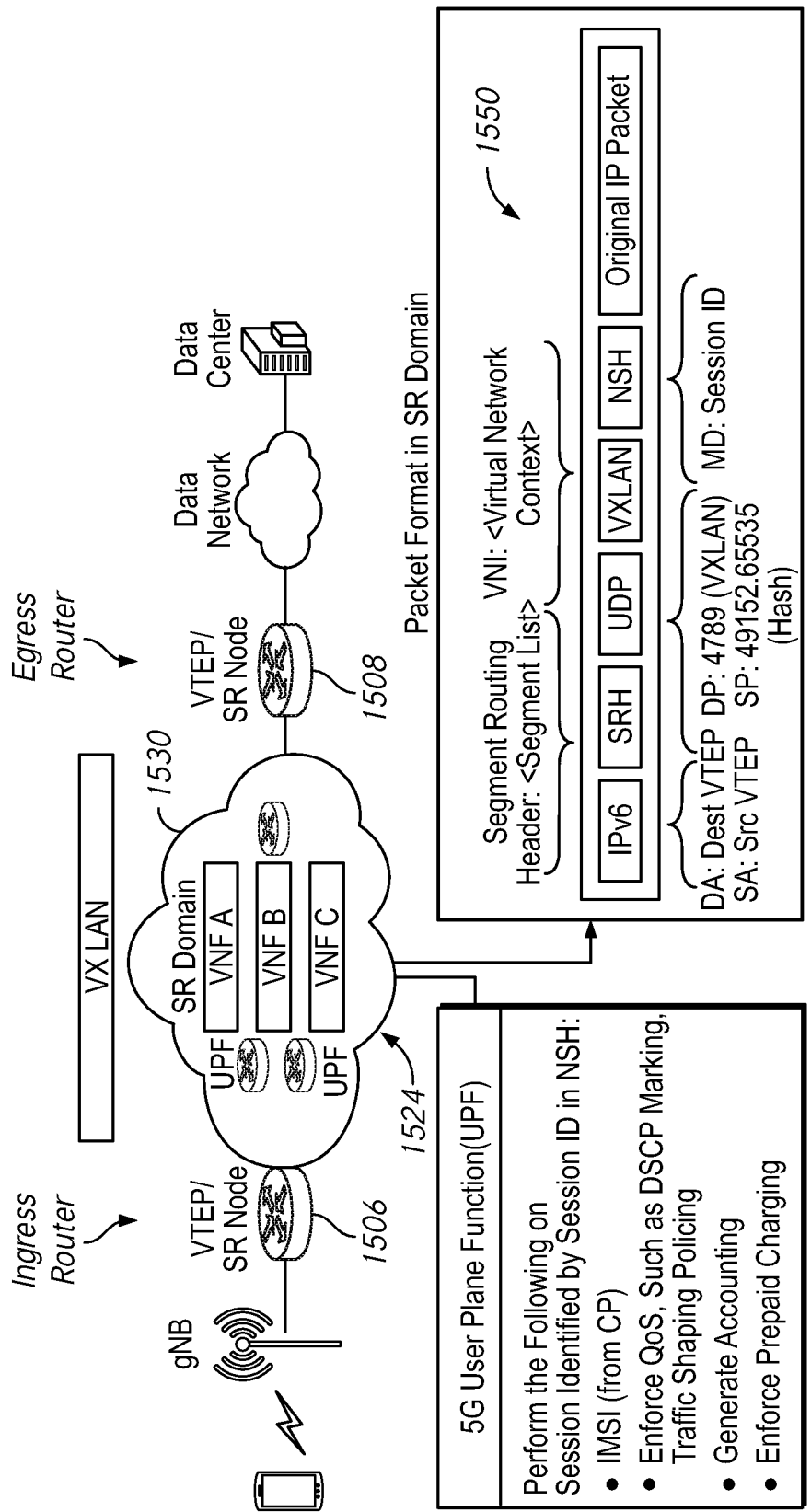
FIG. 15 is an example illustrative diagram of network nodes and tunneling which may be employed in a mobile network, which is suitable for transport and data center segmentation based on security group identity, according to at least some implementations of the present disclosure.

FIG. 15 is an example illustrative diagram 1500 of network nodes and tunneling which may be employed in the mobile network based on the above techniques in accordance with at least some implementations. In FIG. 15, a router node 1506 is indicated as an ingress router node to an SR domain 1530, and a router node 1508 is shown as an egress router node of the SR domain 1530. As indicated, router nodes 1506 and 1508 may be virtual tunnel endpoints (VTEPs) configured to provide virtual networking (e.g. VXLAN segmentation) and tunneling 1524. A packet format of an SRv6 message 1550 in SR domain 1530 is shown in FIG. 15, and with more clarity in the illustrative representation in FIG. 16.

Figure 16:
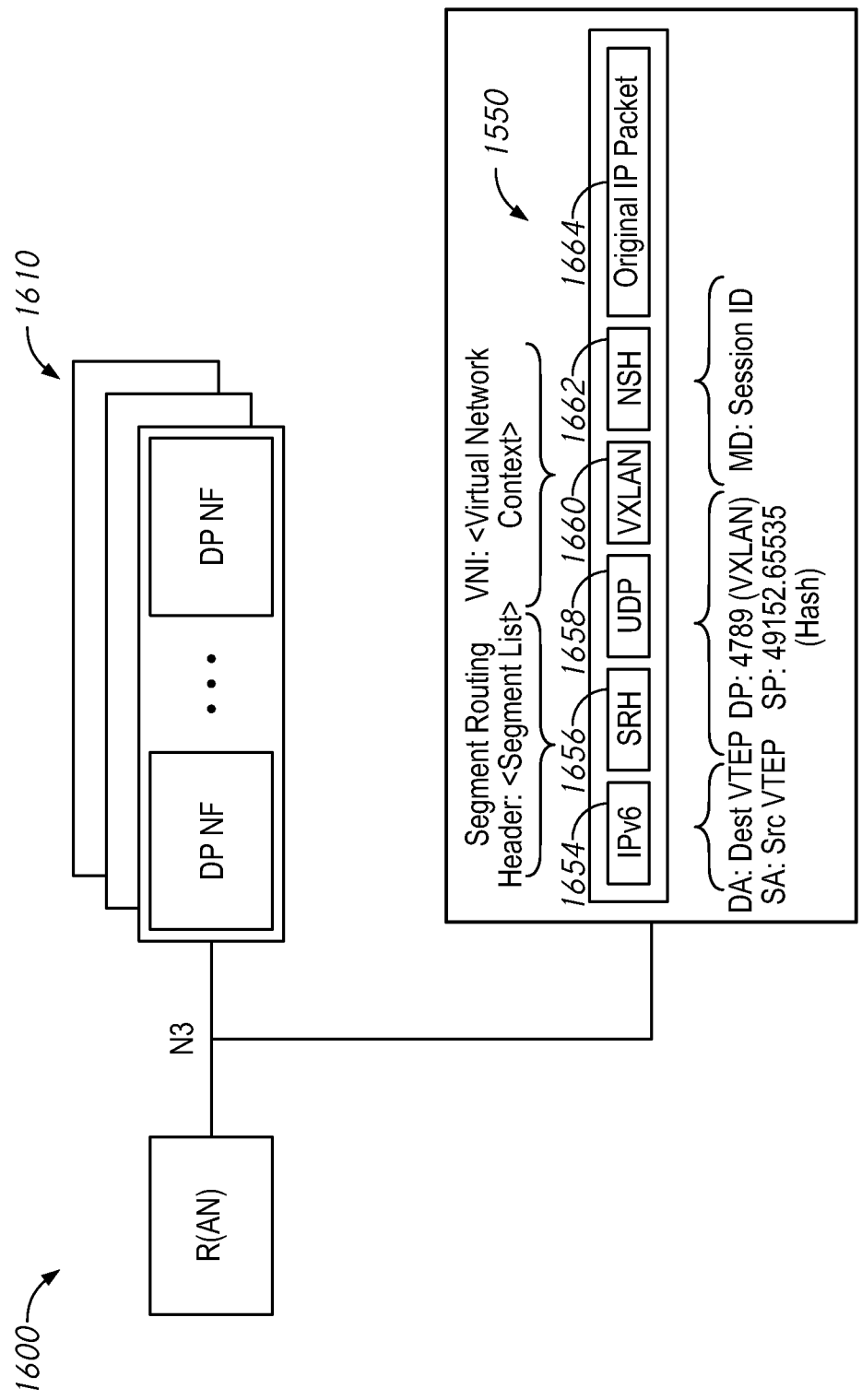
FIG. 16 is a message format which may be utilized for IP messages in an SR domain of a mobile network, suitable for transport and data center segmentation based on security group identity, according to at least some implementations of the present disclosure.

In FIG. 16, SRv6 message 1550 may include an IPv6 header 1654, a SR header (SRH) 1656, a UDP header 1658, a VXLAN field 1660, a network segment header (NSH) 1662, and an (original) IP packet 1664. IPv6 header 1654 may be populated with a destination address of the destination VTEP (i.e. router node 1508 of FIG. 15) and a second address of the source VTEP (i.e. the router node 1506 of FIG. 15). SRH 1656 may be populated with the SID list of the selected SR path. UDP header 1658 may be populated with a destination port of the VXLAN=4789 and a source port of a hash (e.g. 49152-65535). VXLAN field 1660 may be populated with a VNI and/or VNI context. NSH 1662 may be populated with a session ID of the session. In some implementations, NSH 1662 or VXLAN field 1660 may be used for service chaining for various applications within a slice of data plane (DP) network functions (NFs) 1610.

Thus, to summarize some implementations of the present disclosure in relation to FIGS. 14, 15, and 16, segment routing may be used to steer traffic in the SR domain which may be defined at least in part between a set of gNBs and a set of UPFs. Each available UPF may be defined or provided as the endpoint of the last segment (e.g. SID) of one or more segment routes between the gNBs and UPFs. Segment routes to each UPF may be created or calculated for each one of a plurality of security groups. Such a technique may result in a set of segment routes to each UPF, with a segment route corresponding to each security group of a security policy. Thus, traffic segmentation in the transport domain may be provided based on the security group. To further facilitate segmentation for groups of traffic within the data center, an identifier for a VXLAN or a VNI may be appended to the traffic. Thus, a (unique) VNI or VXLAN may be associated with a segment route of the security group. Here, the VNI may be populated and carried in the SRH together with any mobile-identifying information, if and as needed.

During session establishment for a UE associated with a security group, an AMF may determine a network slice and select an SMF for the session. The selected SMF may then request a session policy from PCF. The SMF may receive an identification of a security group (e.g. an SGT) as part of the session policy response. The SMF may then select a UPF which is programmed with relevant flow definition for QoS treatment, charging considerations, etc. An ingress point of the SRv6 domain may be programmed by the SMF with classification rules that direct traffic between the gNB and the UPF to the appropriate segment route associated with the security group. The programming may be alternatively performed by a different entity, such as an SRv6 domain controller, as requested. Subscription identification, such as a MSIDSN or IMSI, may be provided if and as needed. As a result of the prior segmentation provisioning, the choice of segment route based on identifier of the security group may determine the VNI that is associated with the traffic once in the data center.

Thus, subscriber sessions may be distributed amongst UPFs located in an SR domain. Traffic arriving at an SRv6 ingress point from the gNB may be classified and directed to a segment route to a UPF that is identified by a segment route end SID. Appropriate treatment and features may be applied to the traffic at the UPF. In some implementations, an SRH TLV or NSH may be populated with metadata, such as session ID, for the subscriber context; this metadata may provide a correlation to the IMSI, session QoS and/or charging rules, etc., at and for the UPF. The UPF may send the traffic on the interface to the data center, adding the VNI carried in the SRH to an L2 data center header on the N6 interface. In some implementations, the NSH or the VXLAN may be used for service chaining for various applications within a slice of DP NFs. Also in some implementations, the segment route may be enhanced with use of a VRF ID (e.g. per network slice) and metadata (session ID).

In further additional or alternative implementations of the present disclosure, the techniques may involve a (pre-) provisioning a UE with Single-Network Slice Selection Assistance Information (S-NSSAI) (which may have a specific Slice/Service Type and Slice Differentiator) which (uniquely) identifies a network slice associated with an enterprise or enterprise data center; in response to a message indicating a request for a session for the UE, selecting a network slice based on the S-NSSAI, wherein the network slice is associated with one or more UPF instances (and/or routers) associated with SR paths (e.g. SR paths with gNBs) for transport and data center segmentation based on security group as described herein; and facilitating communications for the UE in the mobile network to the enterprise data center using the transport and data center segmentation based on the security group.

Thus, as described above, node selection, including network slicing, may be determined considering security segmentation across application, mobile network, transport and data center domains. SRv6 segment routing may be used to segment applications, mobile network, transport and data center resources to effectively apply joint secure segmentation policies.

In some implementations, joint segmentation of transport and data center resources based on security group policy may be extended to individual processing pools within a data center as segment route endpoints. In some other implementations, the techniques may be extended to multi-access edge computing (MEC) resources (MEC). In even other implementations, the technique may be extended to control plane traffic for a control plane application comprising multiple processing elements, each of which may be represented as a segment route endpoint.

Also in some implementations, application influence may be added to the segmentation polices; this may be implicit by the choice of security group, but exceptions to group policy based on subscription privilege may also be applied. This may involve a more granular flow classification at the (e.g. SRv6) ingress point.

Figure 17:
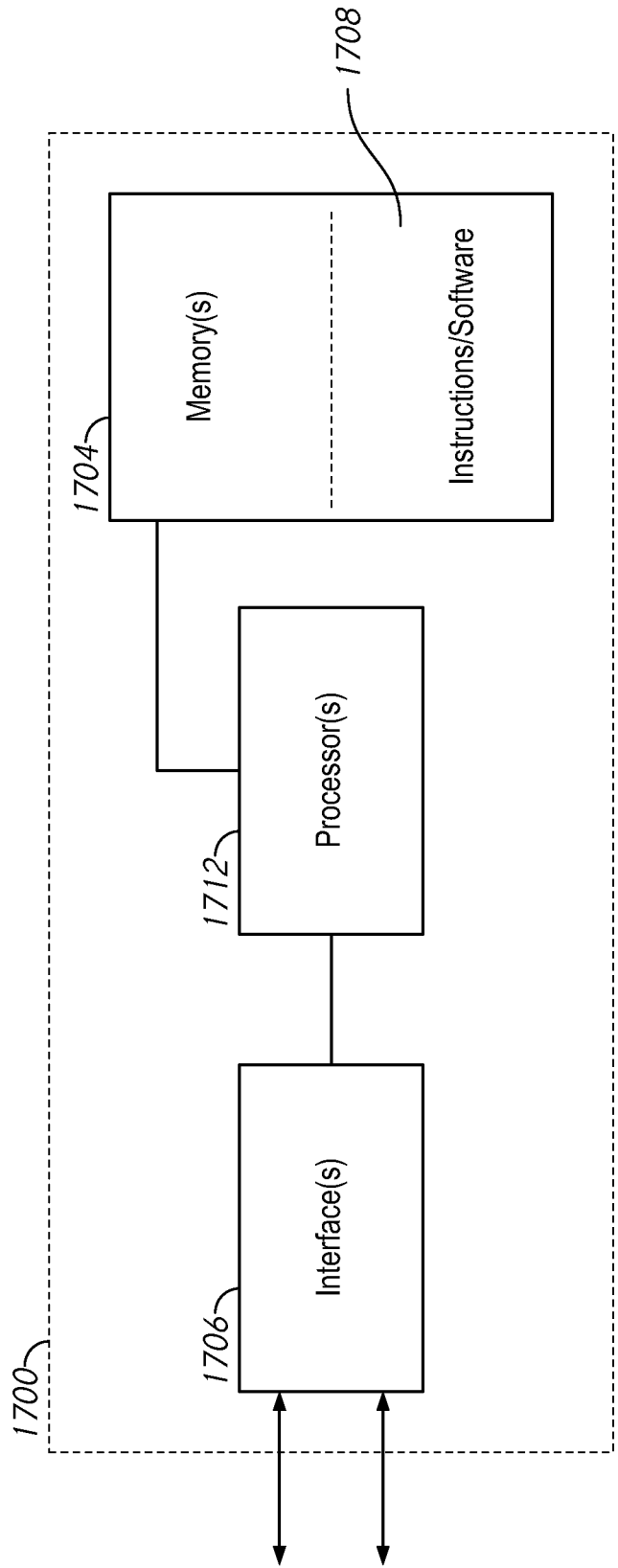
FIG. 17 is an illustrative representation of basic relevant components of a network element, network node, network device, server, or network equipment for use in a mobile network according to some implementations of the present disclosure.

FIG. 17 is an illustrative representation of basic relevant components of a network element, network node, network device, server, or network equipment 1700 for use in a mobile network according to some implementations of the present disclosure. The components may include one or more processors 1712 coupled to one or more memories 1704 and to one or more network interfaces 1706. Interface 1706 may be configured to connect to a network for communications. The one or more processors 1712 are configured to operate in accordance with program instructions/software 1708 stored in the one or more memories 1704, in order to perform basic operations as well as to perform techniques of the present disclosure. Relatedly, a computer program product may include a non-transitory computer-readable medium (e.g. memory, a computer disk, etc.) and program instructions stored in the non-transitory computer-readable medium such that, when executed by one or more processors 1712, may perform the techniques of the present disclosure.

Implementations of the present disclosure have been shown in the figures to apply to a 5G mobile network; however, implementations may be readily applied to other suitable types mobile networks, such as 4G, Long Term Evolution (LTE) based networks having a control and user plane separation (CUPS) architecture, as one ordinarily skilled in the art will readily appreciate. In 4G/LTE with CUPS, the user plane function may be a gateway-user plane (GW-U). As other examples, the SMF may instead be a GW-control plane (GW-C), the AMF may instead be a mobility management entity (MME), the PCF may instead be a policy and control rules function (PCRF), etc. The SMF and GW-C may be more generally referred to as a CP entity for session management. Other naming conventions may be adopted or realized.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first NF instance could be termed a second NF instance, and similarly, a second NF instance could be termed a first NF instance, without changing the meaning of the description, so long as all occurrences of the "first NF instance" are renamed consistently and all occurrences of the "second NF instance" are renamed consistently. The first NF instance and the second NF instance are both NF instances, but they are not the same NF instance.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a router node configured to connect in a transport network used by a mobile network,
        receiving via a base station a message from a user equipment (UE) associated with a security group;
        selecting a segment route (SR) path and an identity of a virtual network according to the security group of the UE, the SR path being one of a plurality of SR paths in a transport network between the base station and a user plane (UP) entity and defined at least in part by one or more segment IDs (SIDs);
        populating an SR header of the message with one or more SIDs of the SR path and including the identity of the virtual network associated with the security group; and
        forwarding the message having the populated SR header to the UP entity via the SR path according to the one or more SIDs.

2. The method of claim 1, wherein the forwarding comprises:
    forwarding to the UP entity that is configured to receive the message, extract from the populated SR header of the message the identity of the virtual network, populate an L2 header of a corresponding message with the extracted identity of the virtual network, and forward the corresponding message to a data network.

3. The method of claim 1, wherein the identity of the virtual network comprises a virtual extensible local area network (VXLAN) network identifier (VNI) associated with a VXLAN of a data center.

4. The method of claim 1, further comprising:
    receiving a message to indicate selection of the SR path and the identity of the virtual network, wherein the selection is based on policy data including an identity of the security group of the UE.

5. The method of claim 1, further comprising:
    participating in a procedure for being provisioned with the SR path and the identity of the virtual network based on an identity of the security group.

6. The method of claim 1, wherein the router node comprises an ingress router between one or more base stations and one or more UP entities.

7. A method comprising:
    obtaining an identity of a security group associated with one or more user equipments (UEs) operative in a mobile network;
    selecting, based on the identity of the security group, a segment route (SR) path for session communications in the mobile network for the one or more UEs, the SR path being one of a plurality of SR paths in a transport network used by the mobile network and defined at least in part by one or more segment IDs (SIDs); and
    causing the selected SR path to be provisioned for use in one or more routers of the transport network of the mobile network, such that Internet Protocol (IP) messages communicated for the one or more UEs in the mobile network are forwarded via the selected SR path associated with the security group.

8. The method of claim 7, wherein causing the selected SR path to be provisioned comprises:
    causing the selected SR path to be provisioned for use in the one or more routers which are configured to receive the IP messages and populate an SR header of each of the IP messages with the one or more SIDs of the selected SR path, for forwarding the IP messages via the selected SR path associated with the security group.

9. The method of claim 7, further comprising:
    receiving a message which indicates a request for creating a session for one of the one or more UEs; and
    in response to receiving the message, requesting and receiving policy data associated with the session, the policy data indicating the identity of the security group associated with the one or more UEs.

10. The method of claim 7, wherein the selected SR path is for exclusive use for the one or more UEs of the security group.

11. The method of claim 7, wherein the selected SR path is one of the plurality of SR paths between a base station and a user plane (UP) entity of the mobile network.

12. The method of claim 7, further comprising:
obtaining an identity of a virtual network based on the identity of the security group, the identity of the virtual network being associated with a tunnel of a plurality of tunnels configurable in the transport network used by the mobile network; and
causing the identity of the virtual network to be provisioned in the one or more routers of the transport network used by the mobile network, such that the IP messages are forwarded via the selected SR path and via the tunnel to a data network.

13. The method of claim 12, wherein the identity of the virtual network comprises a virtual extensible local area network (VXLAN) network identifier (VNI) associated with a VXLAN.

14. The method of claim 7, wherein the identity comprises a first identity, the security group comprises a first security group associated with one or more first UEs, the selected SR path comprises a first selected SR path, and the one or more SIDs comprise one or more first SIDs, the method further comprising:
obtaining a second identity of a second security group associated with one or more second UEs operative in the mobile network;
selecting, based on the second identity of the second security group, a second SR path for session communications in the mobile network for the one or more second UEs, the second SR path being one of the plurality of SR paths in the transport network used by the mobile network and defined at least in part by one or more second SIDs; and
causing the selected second SR path to be provisioned in the one or more routers of the transport network used by the mobile network, such that IP messages communicated for the one or more second UEs in the mobile network are forwarded via the selected second SR path associated with the second security group.

15. The method of claim 7, which is performed by a control plane (CP) entity for session management.

16. A method comprising:
obtaining an identity of a security group associated with one or more user equipments (UEs) operative in a mobile network;
selecting, based on the identity of the security group, a segment route (SR) path for session communications in the mobile network for the one or more UEs, the SR path being one of a plurality of SR paths in a transport network used by the mobile network and defined at least in part by one or more segment IDs (SIDs);
obtain an identity of a virtual network associated with the security group, the identity of the virtual network being associated with a tunnel of a plurality of tunnels configurable in the transport network used by the mobile network; and
causing the identity of the virtual network to be provisioned in association with the selected SR path in one or more routers of the transport network used by the mobile network, such that Internet Protocol (IP) messages communicated for the one or more UEs in the mobile network are forwarded via the selected SR path associated with the security group and subsequently via the tunnel associated with the virtual network.

17. The method of claim 16, wherein causing the selected SR path and the identity of the virtual network to be provisioned comprises:
causing the selected SR path and the identity of the virtual network to be provisioned in association with the selected SR path in the one or more routers which are configured receive the IP messages and populate an SR header of each one of the IP messages with the one or more SIDs of the selected SR path and the identity of the virtual network.

18. The method of claim 16, wherein the selected SR path is one of the plurality of SR paths between a base station and a user plane (UP) entity of the mobile network.

19. The method of claim 16, wherein the identity of the virtual network comprises a virtual extensible local area network (VXLAN) network identifier (VNI) associated with a VXLAN.

20. The method of claim 16, which is performed by a control plane (CP) entity for session management, the method further comprising:
receiving a message which indicates a request for creating a session for one of the one or more UEs; and
in response to receiving the message, requesting and receiving policy data associated with the session, the policy data indicating the identity of the security group associated with the one or more UEs.

* * * * *